US009234797B1

(12) United States Patent  (10) Patent No.: US 9,234,797 B1
Newman et al.  (45) Date of Patent: Jan. 12, 2016

(54) COMPACT THZ IMAGING DETECTOR WITH AN INTEGRATED MICRO-SPECTROMETER SPECTRAL TUNING MATRIX

(71) Applicant: EXELIS, INC., Mclean, VA (US)

(72) Inventors: Jeffrey Daniel Newman, Pittsford, NY (US); Paul Poo-Kam Lee, Pittsford, NY (US); Andrew Paul Sacco, Pittsford, NY (US)

(73) Assignee: Exelis, Inc., Herndon, VA (US)

( * ) Notice: Subject to any disclaimer, the term of this patent is extended or adjusted under 35 U.S.C. 154(b) by 1 day.

(21) Appl. No.: 13/785,435

(22) Filed: Mar. 5, 2013

(51) Int. Cl.
G01J 5/02 (2006.01)
G01J 3/28 (2006.01)

(52) U.S. Cl.
CPC .......................................... *G01J 3/28* (2013.01)

(58) Field of Classification Search
CPC ........................................................ G01J 5/02
USPC .................................................... 250/339.02
See application file for complete search history.

(56) References Cited

U.S. PATENT DOCUMENTS

| 5,550,373 | A | * | 8/1996 | Cole et al. .................. 250/338.1 |
| 5,561,523 | A | | 10/1996 | Blomberg et al. |
| 5,754,948 | A | | 5/1998 | Metze |
| 6,608,711 | B2 | | 8/2003 | Flanders et al. |
| 6,621,083 | B2 | | 9/2003 | Cole |
| 7,372,115 | B2 | | 5/2008 | Baney |
| 7,489,024 | B2 | | 2/2009 | Socher et al. |
| 7,864,326 | B2 | | 1/2011 | Cox et al. |
| 8,198,590 | B2 | | 6/2012 | Cox et al. |
| 9,006,661 | B1 | | 4/2015 | Newman et al. |
| 2005/0179606 | A1 | | 8/2005 | Holly |
| 2006/0152412 | A1 | * | 7/2006 | Evans et al. ............ 343/700 MS |
| 2011/0163932 | A1 | | 7/2011 | Mosbacker |
| 2011/0254959 | A1 | | 10/2011 | Seppa et al. |
| 2011/0315880 | A1 | | 12/2011 | Nemirovsky |
| 2012/0032082 | A1 | | 2/2012 | Pradere et al. |
| 2012/0091342 | A1 | | 4/2012 | Berger et al. |

(Continued)

FOREIGN PATENT DOCUMENTS

| DE | 10 2008 031 751 | * | 8/2009 | ................ H01S 4/00 |
| WO | WO 92/04653 | | 3/1992 | |

OTHER PUBLICATIONS

Machine translation of DE 10 2008 031 751 (Hohmuth et al.).*

(Continued)

*Primary Examiner* — David Porta
*Assistant Examiner* — Edwin Gunberg
(74) *Attorney, Agent, or Firm* — RatnerPrestia

(57) ABSTRACT

A focal plane array (FPA) imaging sensor includes an array of multiple tuning cells disposed on a monolithic substrate, in which each tuning cell includes: (a) a tunable etalon disposed in the monolithic substrate, and (b) a THz detector assembly comprised of at least two antennae disposed in the monolithic substrate. The THz detector assembly is disposed below the tunable etalon. Each tunable etalon includes a Fabry-Pérot interferometer comprised of upper and lower mirrors, spaced by a gap between the mirrors, the gap forming an etalon of the interferometer. The FPA imaging sensor may also be formed as a hybrid, in which portions of the tuning cells are fabricated separately from the THz detector assembly and aligned to each other. The lower mirrors may also be fabricated monolithically with the substrate and the upper mirrors may be formed separately and then aligned to the lower mirrors.

23 Claims, 22 Drawing Sheets

(56) References Cited

U.S. PATENT DOCUMENTS

| | | |
|---|---|---|
| 2012/0261575 A1 | 10/2012 | Averitt et al. |
| 2012/0261579 A1* | 10/2012 | Ramaswamy et al. ........ 250/340 |
| 2013/0082181 A1 | 4/2013 | Corcos et al. |
| 2013/0099118 A1 | 4/2013 | Tomioka |
| 2013/0256535 A1 | 10/2013 | Meijer et al. |

OTHER PUBLICATIONS

P. Krippner, Y. Kühner, J. Mohr, and V. Saile, "Microspectometer System for the Near Infrared Wavelength Range Based on the LIGA Technology", Proceedings of SPIE Vol. 3912, 2000, pp. 3912-3918.

J.N. McMullin, X. Chen, "Integrated Diffraction Grating for Lab-On-A-Chip Microspectrometer", Photonics West 2005, San Jose Convention Center, Jan. 22-27, 2005, p. 5699-76.

G. Chen, Z. Wen, Y. Xu, Z. Jiang, B. Zhang, Miniature Bio-Chemical Analytical System Based on Microspectrometer, Photonics West 2005, San Jose Convention Center, Jan. 22-27, 2005, p. 5719-15.

R.A. Crocombe, D. C. Flanders and W. Atia, "Mico-Optical Instrumentation for Process Spectroscopy", *Proc. of SPIE*, 5591, 2004, pp. 11-25.

Adrian J. Keating, Jarek Antoszewski, Konkaduw K.M.D.B. Silva, Kevin J. Winchester, Thuyen Nguyen, John. M. Dell, Charles A. Musca, Lorenzo Faraone and Olivia Samardzi; *Fabry-Perot MEMS Microspectrometers Spanning the SWIR and MWIR*; Proc. of SPIE vol. 6542, 65423G, 2007.

C.A Musca, J. Antoszewski, K.J. Windchester, A.J. Keating, T. Nguyen, K.K.M.B.D. Silva, J.M. Dell, L. Faraone, P.Mitra, J. D. Beck, M.R. Skokan, J. E. Robinson, "*Monolithic Integration of an Infrared Photon Detector With a MEMS Based Tunable Filter*", IEEE Elec. Dev. Letts., vol. 26, No. 12, Dec. 2005, pp. 888-890.

Antoszewski, Jaroslaw; Keating, Adrian; Winchester, Kevin; Nguyen, Thuyen; Silva, Dilusha; Musca, Charles; Dell, John; Samardzic, Olivia; and Faraone, Lorenzo. Tunable Fabry-Perot Filters Operating in the 3 to 5 um Range for Infrared Micro-Spectrometer Applications, Proc. SPIE—vol. 6186, MEMS, MOEMS, and Micromaching II, 2006, 618608.

Keating, A.J.; Silva, K.K.M.B.D.; Dell, John; Musca, C.A.; and Faraone, L. "Optical Characterization of Fabry-Perot MEMS Filters Integrated on Tunable Short-Wave IR Detectors." IEEE Photonics Technology Letters, vol. 18, Issue 9, May 1, 2006, pp. 1079-1-81.

Rivas, Anette; Kerekes, John; and Raisanen, Alan. "Tunable Singel Pixel MEMS Fabry-Perot Interferometer." Adaptive Optics: Methods, Analysis and Applications Toronto, Canada, Jul. 10, 2011, Joint FTS/HISE/AO/COSI Poster Session (JWA), JWA15.PDF.

Notice of Allowance for U.S. Appl. No. 13/665,114, Issued Dec. 11, 2014.

Perenzoni et al., "A Monolithic Visible, Infrared, and Terahertz 2D Detector," 2010, 35$^{th}$ International Conference on Infrared, Millimeter, and Terahertz Waves, pp. 1-2.

Cleary, Justin W.; Fredricksen, Chris J.; Muravjov, Andrei V.; Enz, Jasen; Dolguikh, Maxim V.; Du Bosq, Todd W.; Peale, Robert E.; Folks, William R.; Pandey, Sidhartha; Boreman, Glenn; and Edwards, Oliver; "Scanning Fabry-Perot Filter for Terahertz Spectroscopy Based on Silicon Dielectric Mirrors", SPIE vol. 6472, 2007.

Cleary, Justin W.; Peale, Robert E.; Todi, Ravi; Sundaram, Kalpathy; and Edwards, Oliver; Finesse of Silicon-Based Therahertz Fabry-Perot Spectrometer, SPIE, 6549-26, vol. 5, Mar. 11, 2007.

Du Bosq, Todd W.; Muravjos, Andrey V.; Peale, Robert E.; and Fredericksen, Christopher J.; "Multilayer Silicon Cavity Mirrors for the Far-Infrared p-Ge Laser"; Applied Optics, vol. 44. No. 33, Nov. 20, 2005.

* cited by examiner

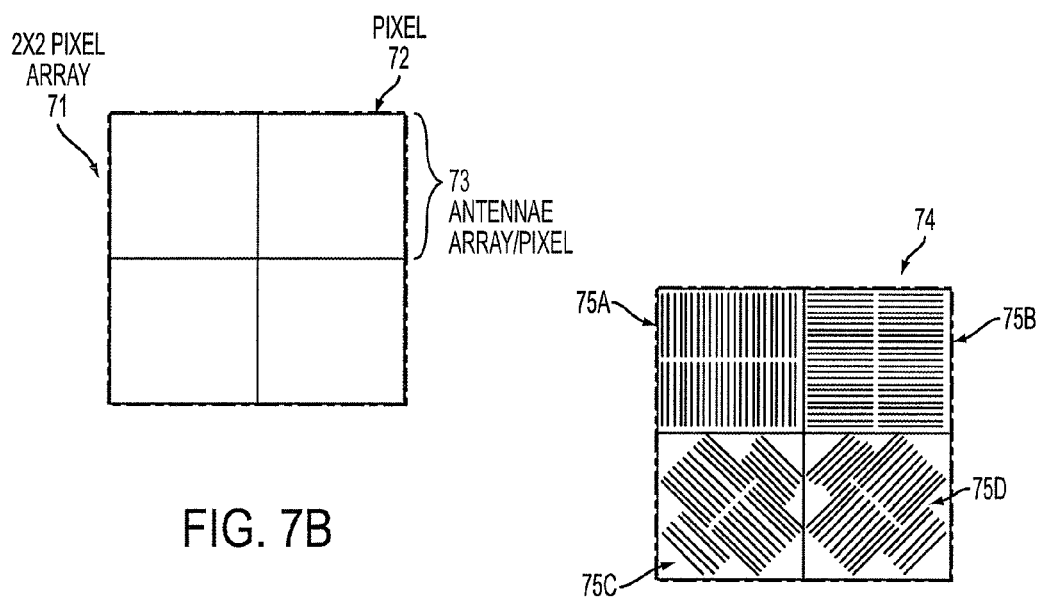
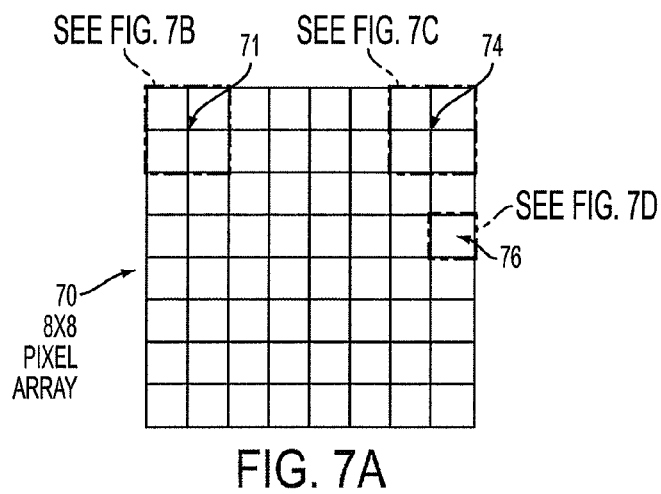
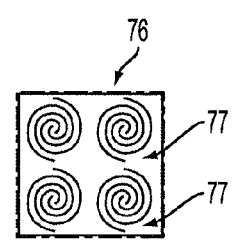
FIG. 7B
FIG. 7C
FIG. 7A
FIG. 7D

COMPACT THZ IMAGING DETECTOR WITH AN INTEGRATED MICRO-SPECTROMETER SPECTRAL TUNING MATRIX

FIELD OF THE INVENTION

The present invention relates, in general, to imaging technology. More specifically, the present invention relates to high pixel density, THz focal plane array (FPA) sensors, in which each pixel unit cell contains multiple THz antennae and at least one cavity tuned Fabry-Pérot filter. The density of THz antennae in the FPA sensor, which are fabricated in a monolithic structure, improves the signal-to-noise-ratio (SNR) of the integrated THz FPA sensor. The cavity tuned filter may also be fabricated in the same monolithic structure as the focal plane, or alternatively it may be fabricated as a hybrid structure that is optically-mechanically aligned and integrated with the THz focal plane.

BACKGROUND OF THE INVENTION

THz detection has many applications. These applications include concealed weapon detection, surveillance cameras, astronomy, non-destructive material testing, as well as ample biological and medical applications. The most common THz detectors currently available are single, or sparse element scanning systems, which typically use heterodyne detection with high speed Schottky diode mixers.

The development of imaging micro-spectrometers operating in the visible, SWIR and MWIR regions of the optical spectrum have been advanced in the last few years through academic and industrial developments. For example, there has been a recently developed short-wave infrared (SWIR) micro-spectrometer based on integration of a parallel plate MEMS optical filter directly with an IR-detector. Monolithic integration of the MEMS filter with the detector is a preferred approach as this reduces the cost of assembly and test of these devices compared with their hybrid equivalents. Hybrid micro-spectrometers have been developed using $Hg_xCd_{1-x}Te$ based detectors, as these detectors may operate across the short-wave (1.6-2.5 um), mid-wave (3-5 um) and long wave (8-12 um) regions of the IR spectrum with extremely high detectivity. A primary technical challenge in achieving the integration of a MEMS Fabry-Pérot filter with the $Hg_xCd_{1-x}Te$ detector is to keep the processing temperatures low.

A MEMS tunable filter may be monolithically integrated with the silicon focal plane electronics device substrate by addition of MEMS processing steps using industry standard wafer processing. For example, following the fabrication of a silicon focal plane device, an overlay metal interconnect/antenna and passivation layers, a lower mirror of a Fabry-Pérot etalon may be deposited using a thermal evaporation process. This lower mirror layer includes silicon compatible layers with dielectric constants consistent with good mirror reflection, such as germanium/silicon layers. This lower mirror layer may be patterned using standard photolithography processes.

A spacer layer is then deposited and patterned to provide mirror structural supports. A silicon nitride stack is then deposited using plasma enhanced chemical vapor deposition to form an upper mirror support and a flexible membrane for the etalon tuning structure. An upper mirror is then deposited on the silicon nitride stack in the same manner as fabrication of the lower mirror. The upper mirror is then patterned to a desired shape and the silicon nitride membrane is subsequently formed using a dry etching process. Metal electrodes are then deposited on top of the mirror to allow operation of the etalon via electrostatic force. Finally, the upper silicon nitride and mirror structure is released by etching away the spacer layer to form the air-gap for the Fabry-Pérot cavity.

In the THz regime (0.1-1.0 mm), however, the current state of art for spectral imaging systems are single point detectors (e.g. Shottky diodes) that are spectrally scanned through tuning of active laser sources, or through time delay spectroscopy using ultrafast laser sources. A 2-dimensional image is achieved by mechanically scanning the single point detector spatially to form an X, Y image. There is no prior art on a large format imaging focal plane array (FPA) with THz imaging detectors that also includes digitally tunable optical filters that are integrated onto a monolithic chip.

There are also many shortcomings with current THZ detectors. There is an ever present need for THz detectors with a higher quantum efficiency, a higher level of detector integration in low cost, non-bulky systems, and an improved signal-to-noise ratios (SNR).

SUMMARY OF THE INVENTION

To meet this and other needs, and in view of its purposes, one embodiment of the present invention provides a focal plane array (FPA) comprising an array of multiple tuning cells disposed on a monolithic substrate, in which each tuning cell includes: (a) a micro electrical mechanical system (MEMS) tunable etalon disposed in the monolithic substrate, and (b) a THz detector assembly comprised of at least two antennae disposed in the monolithic substrate. The THz detector assembly is disposed below the MEMS tunable etalon.

The array of multiple tuning cells includes an M×N array, where M represents an integer number of rows and N represents an integer number of columns in the array. Each tuning cell has length and width dimensions of approximately. 250 microns to approximately 400 microns.

Each MEMS tunable etalon includes a Fabry-Pérot interferometer comprised of upper and lower mirrors, spaced by a gap between the mirrors, the gap forming an etalon of the interferometer. The upper and lower mirrors are spaced by either a three-point mount or a four-point mount, and the mount is configured to provide the gap between the mirrors.

The gap is configured to provide a tuning range, in which the tuning range has a resonance centered about a predetermined band, and the predetermined band covers a portion of a range spanning 600 GHz to 2600 GHz. The gap is configured to include a spacing between the upper and lower mirrors, and the gap provides an optical spacing for the interferometer which is selected to vary over 250 microns.

The THz detector assembly may include two spiral arm antennas. Each spiral arm antenna is coupled to a detector, and the detector is located below the MEMS tunable etalon and at a center region of the THz detector assembly.

The THz detector assembly may include at least four sets of two spiral arm antennas. Each set of two spiral arm antennas is coupled to a respective detector, and the respective detector is located below the MEMS tunable etalon and at an equal distance from a center region of the THz detector assembly.

The THz detector assembly may include multiple sets of two spiral arm antennas. Each set of two spiral arm antennas is configured to resonate at a predetermined resonance frequency, and a resonance frequency of one set is different from a resonance frequency of another set. Each set of two spiral arm antennas is located below the MEMS tunable etalon and at a different distance from a center region of the THz detector assembly.

The THz detector assembly may include an array of THz antennae. Each THz antenna may be shaped in a bow-tie configuration and may be coupled to an amplifier. A summing circuit may be included for summing signals received by the array of THz antennae and provide an enhanced output signal.

The FPA may further include an array of multiple tuning cells forming a first M×N matrix of tuning cells, where M represents an integer number of rows and N represents an integer number of columns in the array, and each MEMS tunable etalon corresponds to each tuning cell in the array. Each THz detector assembly may be disposed below each MEMS tunable etalon, thereby forming a second Y×Z matrix of THz antennas, wherein Y represents an integer number of rows greater than N, and Z represents an integer number of columns greater than M.

Another embodiment of the present invention is a THz spectrometer comprising: (a) a first array of tunable etalons, in which the tunable etalons are arranged in a matrix of N×M rows and columns, respectively; (b) a second array of THz antennae, in which the THz antennae are arranged in a matrix of Y×Z rows and columns, respectively. The first array is disposed above the second array. The first array is configured to receive THz radiation and output filtered THz radiation, and the second array is configured to receive the filtered radiation from the first array and provide output signals to a substrate, which is disposed below the second array. In addition, a summing circuit may be disposed in the substrate for summing the output signals received from the second array, and provide an enhanced signal of the filtered radiation. An image processor may also be included for scanning rows and columns of the second array and providing an output image representing the scanned rows and columns.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures:

FIGS. 7A-7D are planar views of different antennae array configurations that may be fabricated underneath each single tuning cell in the THz FPA imaging sensor, in accordance with an embodiment of the present invention.

DETAILED DESCRIPTION OF THE INVENTION

The present invention provides a monolithic integrated, high pixel density, THz focal plane array (FPA) sensor, in which each pixel unit cell contains multiple THz antennae and at least one cavity tuned Fabry-Pérot filter. The density of THz antennae in the FPA improves the signal-to-noise-ratio (SNR) of the integrated THz FPA sensor, which is fabricated in one monolithic structure. The cavity tuned Fabry-Pérot filter is also fabricated in the same monolithic structure.

Figure 1:
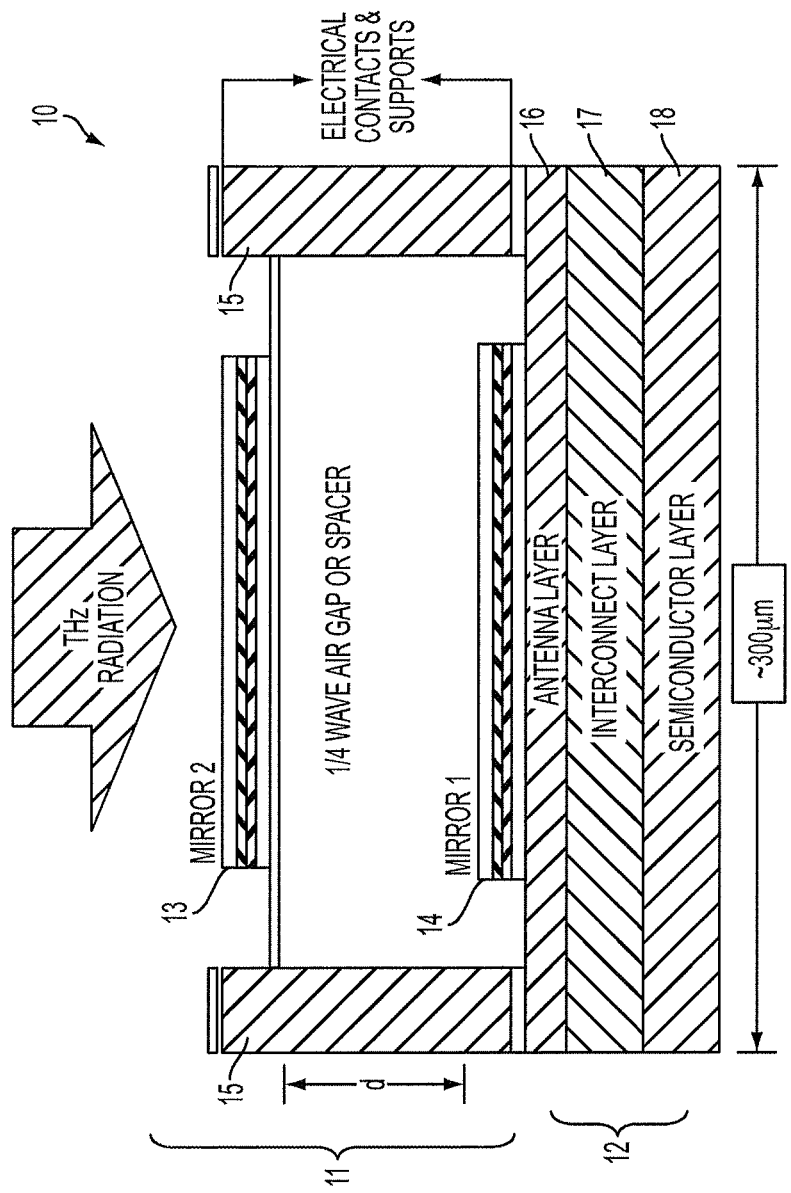
FIG. 1 is a cross sectional view of a portion of a THz spectrometer fabricated in a monolithic structure, showing a single tuning cell disposed above a THz detector assembly, in accordance with an embodiment of the present invention.

Referring first to FIG. 1, there is shown a portion of a THz spectrometer, generally designated as 10. The portion shown is that of a single tuning cell which is part of an array including M×N tuning cells, in which M represents the number of rows and N represents the number of columns in the array. The single tuning cell, also referred to as a unit tuning cell, includes a MEMS tunable etalon, generally designated as 11, is disposed on top of a THz detector assembly, generally designated as 12. As will be explained later, THz detector assembly 12 may include multiple antennae and multiple detectors all disposed below a single MEMS tunable etalon 11. Both MEMS tunable etalon 11 and THz detector assembly 12 are monolithically fabricated using standard CMOS processes to form a highly compact, integrated device (described later). The unit tuning cell 10, as an example, may have nominal in-plane dimensions (Lx, Ly) of about 300 um×300 um. The 300 um×300 um unit cell dimensions are nominally designed to scale to the wavelength of a 1.0 THz optical source which, as known to those skilled in the art, defines a minimum optical resolution spot sized for a 1.0 THz imaging system (for this example).

The THz detector assembly 12 includes several layers, in which only three layers are shown, such as a top planar antennae layer 16, a semiconductor layer 18, and an interconnect layer 17. The interconnect layer is disposed between antenna layer 16 and semiconductor layer 18.

The semiconductor layer 18 may include a CMOS or a BICMOS substrate. In embodiments where semiconductor layer 18 includes a CMOS substrate, the THz detector assembly may be fabricated in a standard CMOS foundry process, utilizing low bandwidth resistive, self-mixing field-effect transistors (FETs). In embodiments where semiconductor layer 18 includes a BiCMOS substrate, the THz detector assembly may be fabricated in a high speed BiCMOS SiGe foundry process (for example, IBM 9-HP) enabling use of high bandwidth (for example, greater than 300 GHz) direct detection amplifiers that are capable of responding at full THz optical bandwidth.

The interconnect layer 17 may be an assembly of several layers disposed above semiconductor layer 18. Each interconnect layer 17 may include metallic vias and strips, which allow the antennae array to be coupled to high gain transistors (not shown). The interconnect layer 17 may also include multiple waveguides with each waveguide coupling a respective antennae array to other circuits including high gain transistors.

The top planar antenna layer 16 includes one or more deposition layers of antennae. The various antennae configurations are described later.

Referring now to the top portion of FIG. 1, a parallel plate tunable etalon 11 may be fabricated using a multilayer stack. Typically, the multiple layers include $S_iN_2$ outer layers with a deposited aluminum inner layer. These stacks form the mirrors of the Fabry-Pérot filter. As shown in FIG. 1, lower mirror 1 is formed from a multilayer stack 14 and upper mirror 2 is formed from a multilayer stack 13. The THz wavelength tuning is achieved with a configurable electro-static voltage applied across the MEMS actuators 15 that mechanically support the two dielectric mirror stacks. The mechanical supports and electrical contacts are schematically shown in FIG. 1. The mechanical supports achieve wavelength tunability across a THz bandpass of interest with moderately narrow filter line-width. The ¼ wave tunable air gap is achieved using an $S_1O2$ sacrificial layer which is removed with a dry etch (a standard process for MEMS fabrication in CMOS).

In the illustrated structure of FIG. 1, 'd' has a thickness equal to an optical rest length of the interferometer. The region in which the material has been moved to form the gap, or space by etching, for example, is called an etalon of the interferometer.

A Fabry-Pérot interferometer has a construction in which etalon length may be controlled by electrostatic deflection. Thus, the center wavelengths of the interferometer passbands may also be controlled. The basic equation of the Fabry-Perot interferometer may be written as follows:

$$2nd = m\lambda$$

where d is the etalon thickness between the mirrors,
m is an integer (i.e., axial mode number of the interferometer etalon, or order number of interference),
n is the refractive index of the etalon medium, and
λ is the wavelength.

Figure 2A:
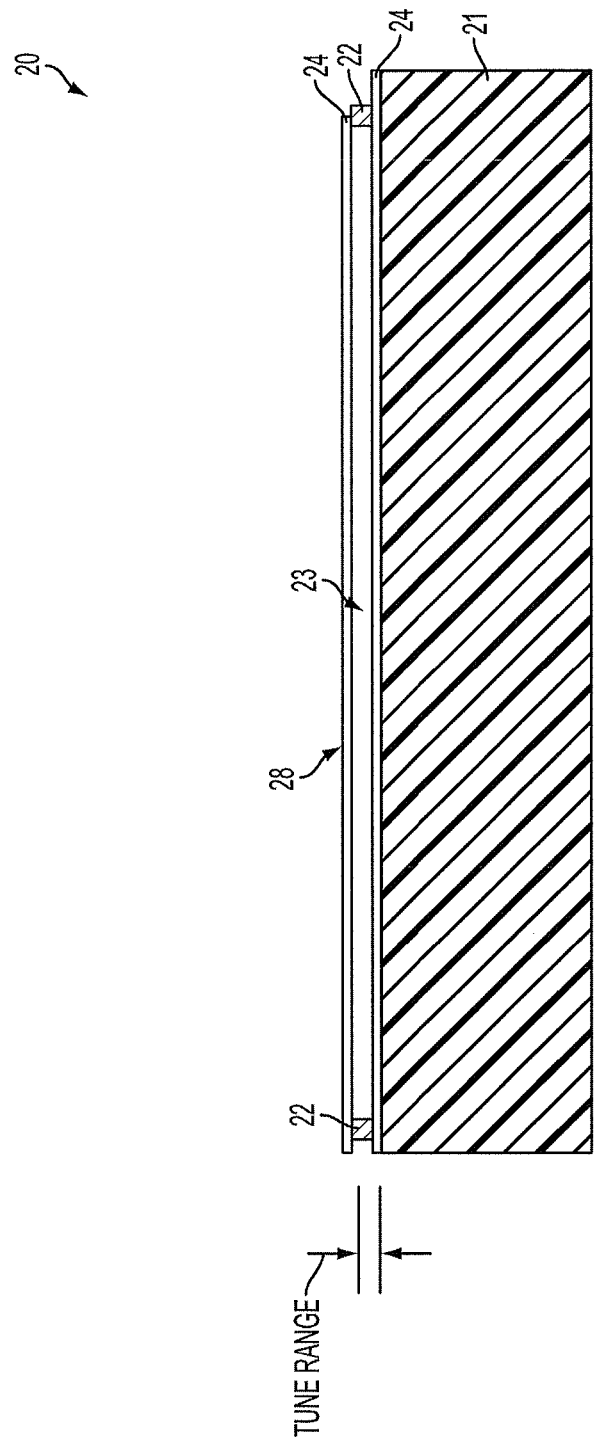
FIG. 2A is a cross sectional view of a portion of a THz spectrometer including a large format etalon tuning layer with piezo-electric actuators mounted on top of a silicon wafer, in which the top layer of the silicon wafer includes an antennae array, in accordance with an embodiment of the present invention.
Figure 2B:
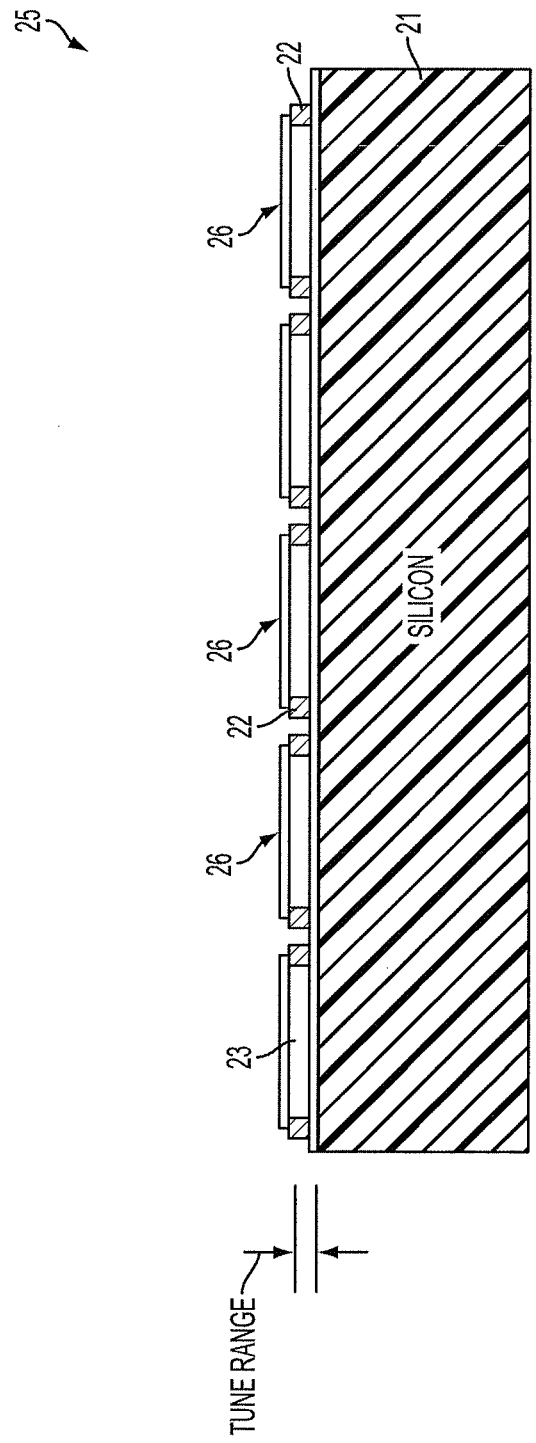
FIG. 2B is a cross sectional view of a portion of a THz spectrometer including individually actuated tuning cells mounted on top of an antennae array formed on the top of a silicon wafer, in accordance with an embodiment of the present invention.

Referring next to FIGS. 2A and 2B, two different embodiments of the present invention are shown. A Fabry-Pérot interferometric spectrometer 20 is shown in FIG. 2A, in which a single, large format etalon tuning layer with piezoelectric actuators are mechanically mounted on top of a silicon wafer. As shown, a THz detector assembly which includes an array of THz antennae with detector cells (shown in FIGS. 3 through 12, for example) are fabricated on the top layer of silicon wafer 21. The top layer of silicon wafer 21 is also polished to less than 1 micron flatness across the active area of the etalon. The top layer forms the lower mirror of the Fabry-Pérot etalon 28. The upper mirror of the tuning etalon with the actuators/supports 22 are then formed above the top layer of silicon wafer 21. This forms the complete tuning etalon 28 with the two mirrors 24 having a gap, or space 23 in between the two mirrors. The etalon gap width 23 of the Fabry-Pérot spectrometer nominally corresponds to ½ of a wavelength of the peak spectrometer output response. For example, assuming an air gap for which n=1, the spectrometer may be tuned over a frequency range of 0.6 THz to 2.6 THz by varying the etalon gap width 23 from 250 um (corresponding to a 0.6 THz peak output response) to 58 um (corresponding to a 2.6 THz peak output response). The ability to continuously and accurately tune the etalon gap through approximately 200 um net travel range is within the capabilities of stacked piezo-electric actuator cells. The embodiment shown in FIG. 2A advantageously uses the standing wave resonance of the silicon to form a tunable comb filter, as the Fabry-Pérot tuning etalon is tuned.

Another embodiment of the present invention is shown in FIG. 2B, as Fabry-Pérot interferometric spectrometer 25. This embodiment includes smaller, individually actuated Fabry-Pérot tuning cells 26, which are mounted on top of an antennae array (see FIGS. 3 through 12, for example). As one option, the Fabry-Perot cells 26 may be mounted on the back side of silicon wafer 21 or on a separate silicon substrate 21.

Figure 2C:
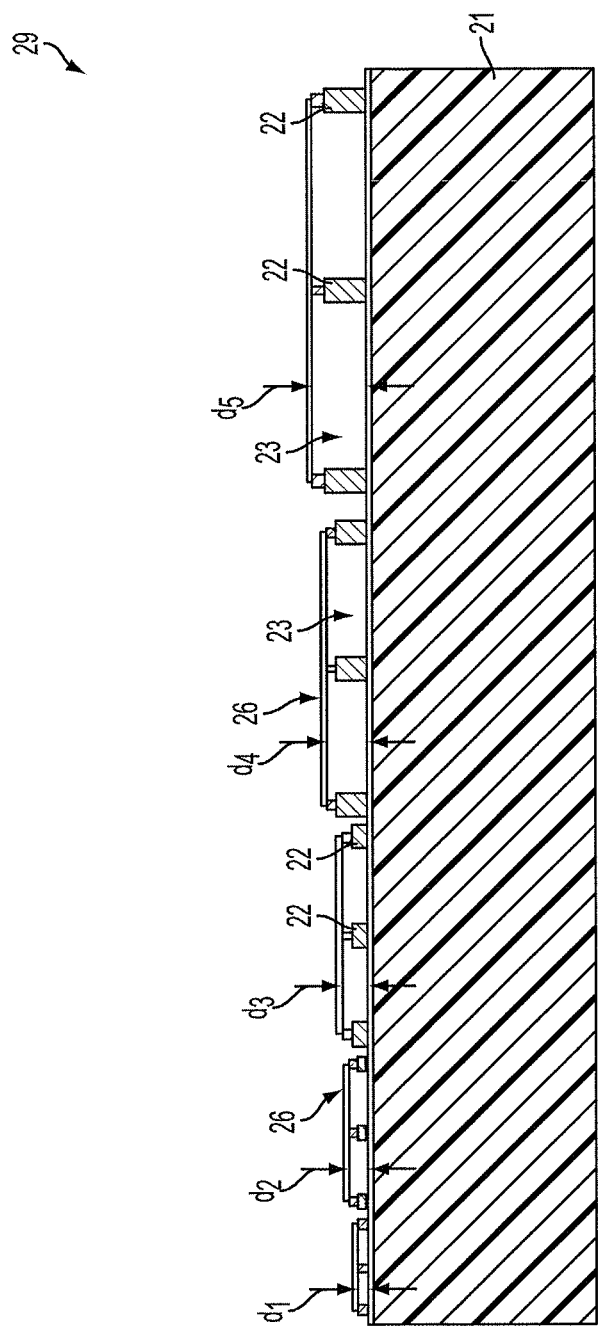
FIG. 2C is a cross sectional view of a portion of a THz spectrometer including individually actuated tuning cells mounted on top of an antennae array formed on the top of a silicon wafer, in which five different gap sizes are shown that correspond to five different tuning bands, in accordance with an embodiment of the present invention.

Still another embodiment of the present invention is shown in FIG. 2C, as Fabry-Pérot interferometric spectrometer 29. This embodiment includes smaller, individually actuated Fabry-Pérot tuning cells 26, which are mounted on top of an antennae array (see FIGS. 3 through 12, for example). Each Fabry-Pérot cell 26, however, has a different sized gap, shown as $d_1$ through $d_5$, corresponding to a different centered rest length, respectively.

Figure 2D:
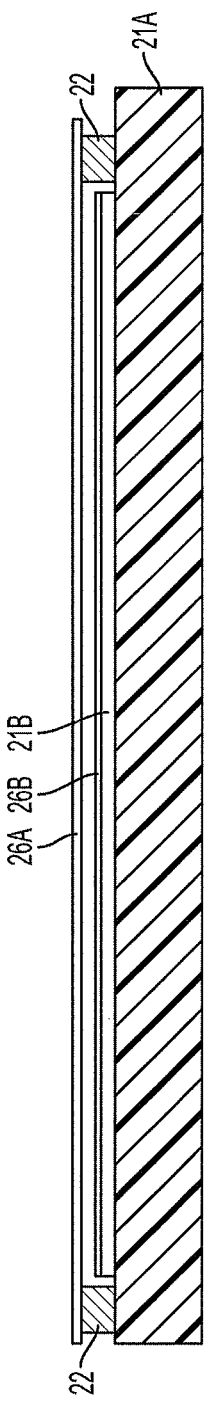
FIG. 2D is a cross sectional view of a portion of a THz spectrometer that is constructed as a hybrid structure, in which a lower Fabry-Pérot mirror is fabricated monolithically to the THz focal plane on top of the antenna layer; and an upper Fabry-Perot mirror is independently mounted onto a separate optical-mechanical structure, which is supported by a piezo-electric stack that allows the upper mirror to be tuned over approximately 250 microns of travel. This provides narrow band tuning across the entire THz focal plane over an approximate range of 0.6 THz to 2.6 THz, in accordance with an embodiment of the present invention.
Figure 2E:
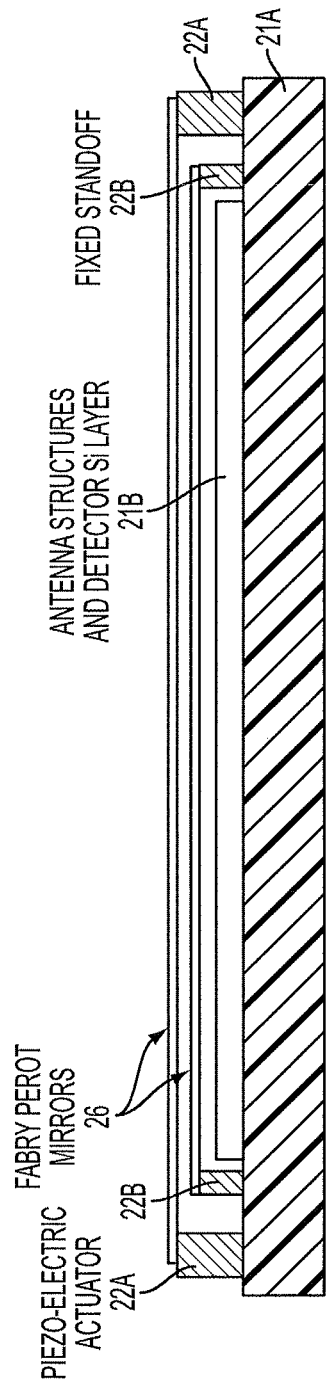
FIG. 2E is a cross sectional view of a portion of a THz spectrometer that is constructed as a hybrid structure, in which both of the Fabry-Pérot mirrors are independently mounted onto a separate optical-mechanical structure supported by a piezo-electric stack. This allows the air gap between either the upper or lower mirror to be tuned over approximately 250 microns of travel. In addition, this provides narrow band tuning across the entire THz focal plane over an approximate range of 0.6 THz to 2.6 THz, in accordance with an embodiment of the present invention.

FIGS. 2D and 2E show two additional embodiments of the present invention, in which a tunable etalon is fabricated as a hybrid structure. In FIG. 2D, the lower Fabry-Pérot mirror 26B is fabricated monolithically to the THz focal plane on top of the antenna layer 21B, the latter deposited on top of substrate 21A. The upper Fabry-Pérot mirror 26A is independently mounted to a separate optic-mechanical structure supported by a piezo-electric stack, designated as 22, that allows the upper mirror 26A to be tuned over approximately 150 microns of travel. This provides narrow band tuning across the entire THz focal plane over an approximate range of 0.6 THz to 2.6 THz.

FIG. 2E shows a similar hybrid structure to that shown in FIG. 2D, in which both of the elation mirrors 26 are independently mounted to a separate optic-mechanical structure supported by a piezo-electric stack, designated as 22A and 22B. This allows either the upper or lower mirror to be separately tuned over approximately 150 microns of travel. This also provides narrow band tuning across the entire THz focal plane over an approximate range of 0.6 THz to 2.6 THz. In both hybrid tuning layer embodiments shown in FIGS. 2D and 2E, the piezo-electric actuated tuning etalons are constructed independently from the silicon wafer 21A and then assembled together to form a filter for the THz radiation impinging on the antenna structure and detector layer 21B.

There are many other possible configurations of antennae arrays contemplated by the present invention that may be formed below each Fabry-Pérot tuning cell. Some of the contemplated configurations are now described by reference to FIGS. 3 through 12.

Figure 3A:
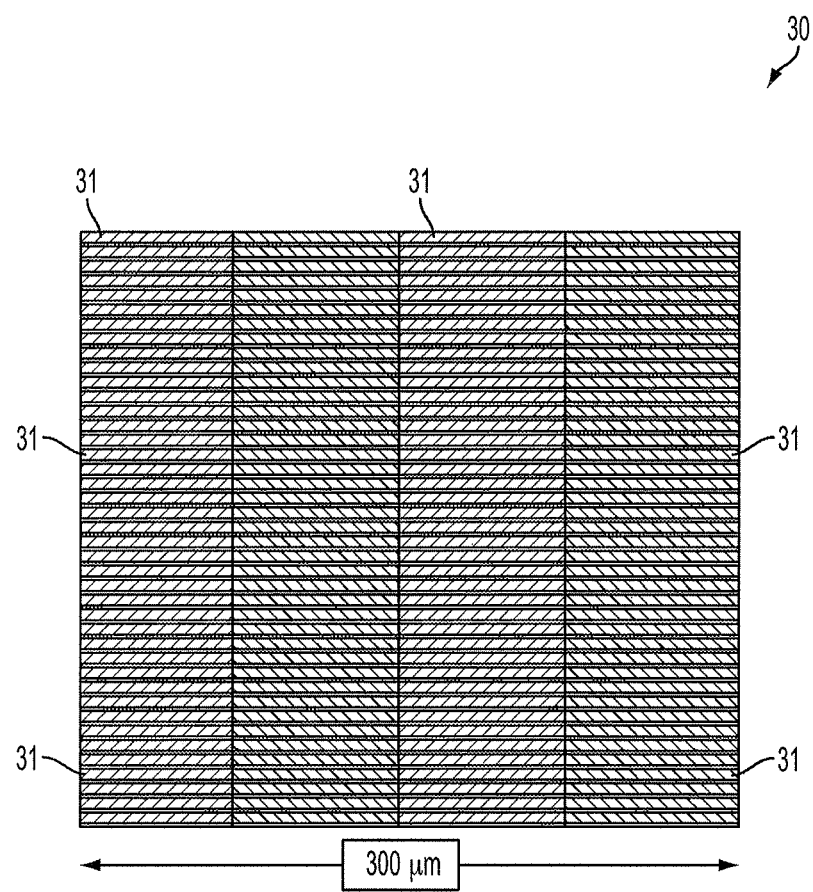
FIG. 3A is a planar view of a single pixel unit cell of a THz FPA imaging sensor, in which only the antennae array is shown, in accordance with an embodiment of the present invention.
Figure 4:
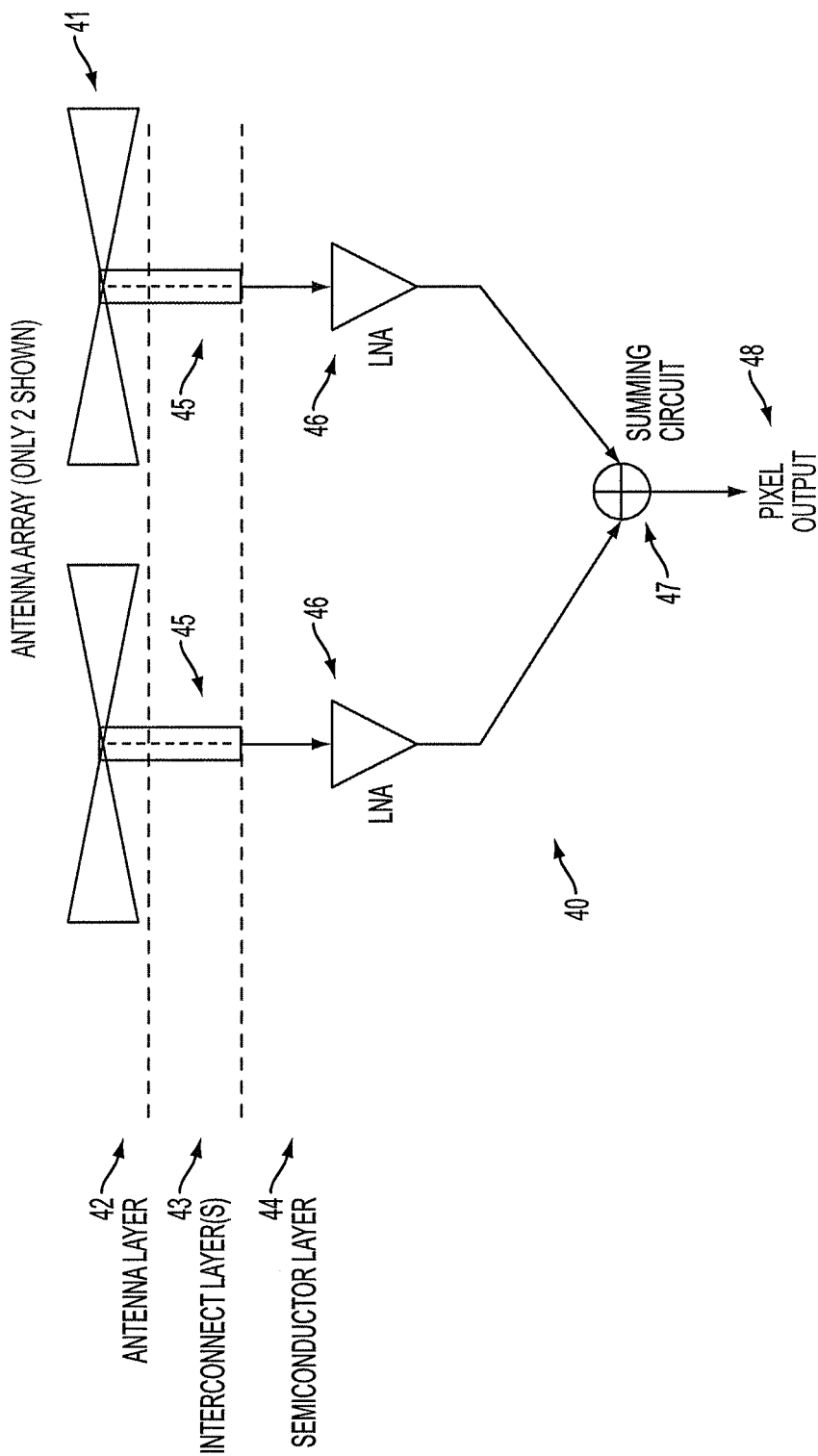
FIG. 4 is a circuit block diagram of a portion of a pixel unit cell for incoherently summing the signals sensed by multiple antennae in the antennae array that is formed below each etalon tuning cell, in accordance with an embodiment of the present invention.
Figure 5:
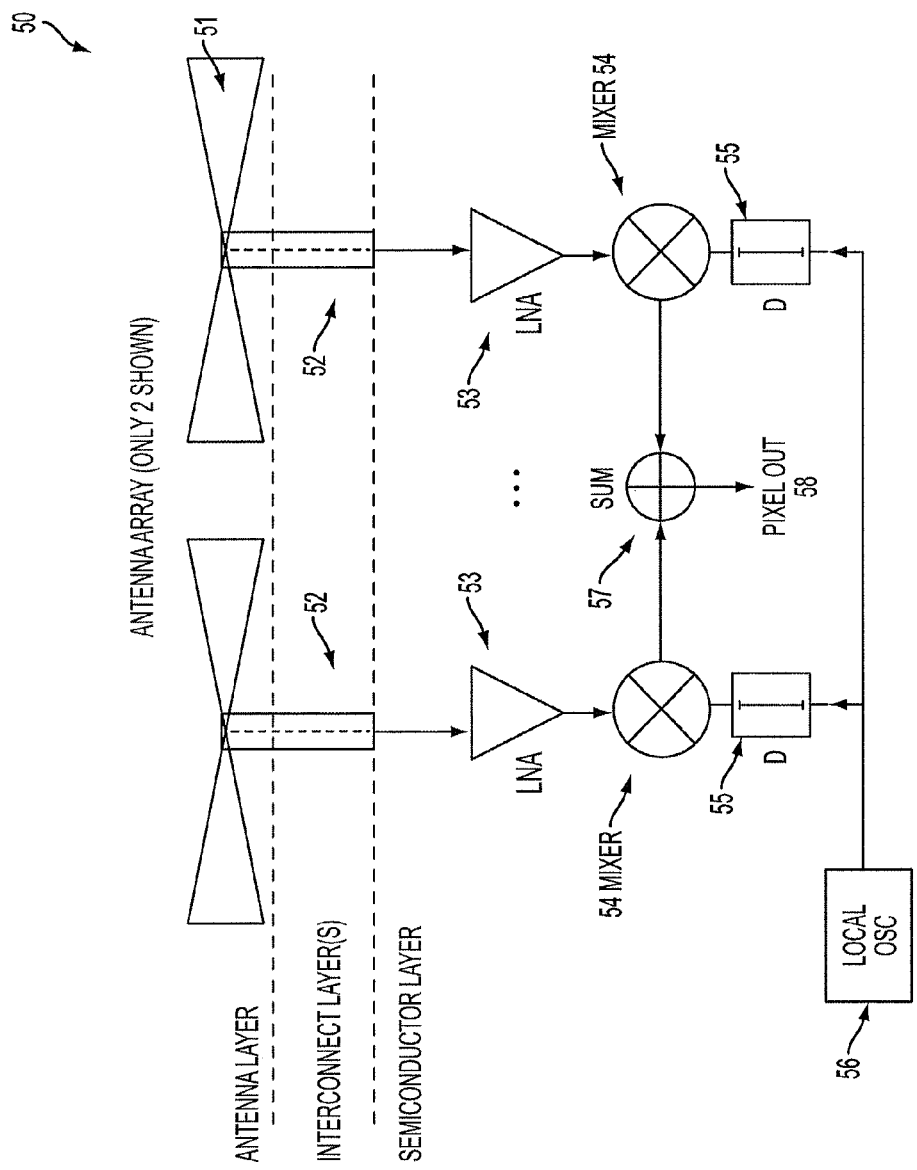
FIG. 5 is a circuit block diagram of a portion of a pixel unit cell for coherently summing the signals sensed by multiple antennae in the antennae array that is formed below each etalon tuning cell, in accordance with an embodiment of the present invention.

FIG. 3A is a planar view of a single pixel unit cell of a THz FPA imaging sensor (see FIG. 8 for example), in accordance with an embodiment of the present invention. The pixel unit cell 30 has length and width dimensions of about 300 um by 300 um. The top surface of pixel unit cell 30 includes a plurality of antennae 31 arranged in an array configuration. Each antenna 31 that is disposed on pixel unit cell 30 has a length dimension of about 75 um and a width dimension of less than 10 um. The number of antennae 31 on pixel unit cell 30, as shown in FIG. 3A, may be up to 160 antennae (for example). As shown, antennae array 30 is configured as an array having 4 columns by 40 rows. Each antenna 31 is shaped like a bow-tie, as best shown in FIGS. 4 and 5.

It will be understood that each THz FPA imaging system includes many pixel unit cells. For example, a THz FPA imaging system may include an array of 800×800 pixel unit cells. Assuming this THz FPA imaging system and assuming the interleaved arrangement shown in FIG. 3A of antennae array 30, then there would be 800×800×160 THz antennae 31 in each THz FPA imaging system of the present invention.

Figure 3B:
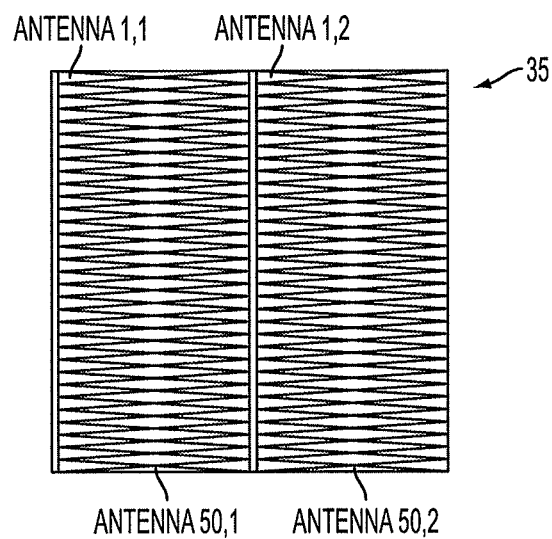
FIG. 3B is a planar view of another single pixel unit cell of a THz FPA imaging sensor, in which only the antennae array is shown, in accordance with an embodiment of the present invention.

One more example of a THz FPA imaging system is shown in FIG. 3B. Antennae array 35 includes a multiplicity of antennae, each of which may be tuned to a desired THz wavelength. Each antenna in antennae array 35 may be a dipole antenna and, for example, may be configured in a bow-tie configuration having two triangular sides, as shown in FIGS. 4 and 5. Each triangular side of a dipole antenna is a quarter wavelength in length. Each antenna in antennae array 35 is spaced from adjacent antennae to reduce interference. As shown, per a single pixel cell unit, antennae array 35 is comprised of one hundred antennae, arranged in two columns by fifty rows, with vertical and horizontal spacings of about 6 um. Each antenna in antennae array 35 is labeled in a column by row (M×N) designation, such as antenna 1,1, antenna 1,2, . . . , antenna 50,1 and antenna 50,2.

In an alternative embodiment, antennae array 35 includes one hundred and twenty antennae arranged in two columns by sixty rows, with spacing of about 5 urn between each respective antenna. In yet another embodiment, antennae array 35 includes two hundred and forty antennae arranged in four columns by sixty rows, with spacings of about 5 um between each respective antenna.

Each antenna in antennae array 35 or antennae array 30 is coupled to a circuit fabricated in silicon wafer 21, as described below by reference to FIGS. 4 and 5. Referring first to FIG. 4, there is shown a circuit block diagram of a portion of a pixel unit cell for summing the signals sensed by antennae array 41. The multiple antennae in array 41 are disposed in antenna layer 42 of each pixel unit cell. Each antenna in antennae array 41 is configured in a bow-tie shape. Other suitable antenna-shaped configurations will be understood by one skilled in the art.

Each antenna in array 41 is coupled to a low noise amplifier (LNA) 46, which is disposed in semiconductor layer 44. The coupling is accomplished by a waveguide 45, which is disposed in interconnect layer 43. Each antenna in the array detects a THz signal which is sent to a respective LNA 46 via a respective waveguide 45. Each LNA 46 amplifies the detected signal to a voltage level which is summed with other amplified detected signals from other antennae in the array.

The summations are incoherently performed by summing circuit 47, thereby providing a pixel output 48 from the respective unit pixel cell in the THz FPA sensor system. It will be understood that each antenna in array 41 may have a separate LNA 46, such that the number of LNAs in a pixel unit cell is equal to the number of antennae in the array. In the example of FIG. 4, each antenna disposed in layer 42 in the single pixel unit cell is summed by summing circuit 47 to produce one pixel output 48. Accordingly, if there are 800× 800 pixel unit cells, for example, in a THz FPA sensor system, then there would be 800×800 pixel output signals 48.

FIG. 4 shows the summing circuit located in semiconductor layer 44. In an alternative embodiment, summing circuit 47 may be located externally of each pixel unit cell.

Reference is now made to FIG. 5, which shows another embodiment in the summation of signals detected by an antennae array. Different from the summation shown in FIG. 4, the summation shown in FIG. 5 is performed coherently, as depicted by a portion of a pixel unit cell. As shown, each antenna (two are shown) in array 50 are configured in a bow-tie configuration. Each antenna 51 in the array is coupled to a respective LNA 53, which is disposed in the semiconductor layer. Each antenna in array 50 detects a THz signal which is sent to a respective LNA 53 via a respective waveguide 52. Each LNA 53 amplifies the signal and sends the signal to a respective mixer 54. Each mixer 54 multiplies the detected signal with a known signal from a local oscillator 56. The signal arriving from the local oscillator is delayed as necessary by a respective delay line 55. This enables coherent summation of all the multiplied signals by way of summation circuit 57.

The summed signal is provided as a pixel output signal 58 and corresponds to a coherent summation of all the detected signals from antenna array 50 disposed in a single pixel unit cell. As previously described, there are numerous pixel unit cells in each THz FPA sensor system. Accordingly, there are multiple pixel output signals 58 that correspond to the multiple pixel unit cells in the THz FPA sensor system.

As known in the art, mixer 54 may be a heterodyne mixer. In an embodiment where mixer 54 is a heterodyne mixer, the mixer may be configured to down convert the amplified signal. Although not shown, each antenna in array 50 disposed on the antennae layer may have a discrete LNA 53 and a mixer 54. Thus, the number of LNAs and mixers in a pixel unit cell equals the number of antennae 51 in the array.

As shown in FIG. 5, local oscillator 56 is disposed externally of the pixel unit cell. The local oscillator, which may be shared by many, or all the pixel unit cells in the THz FPA sensor system, may be programmable or fixed.

Figure 6:
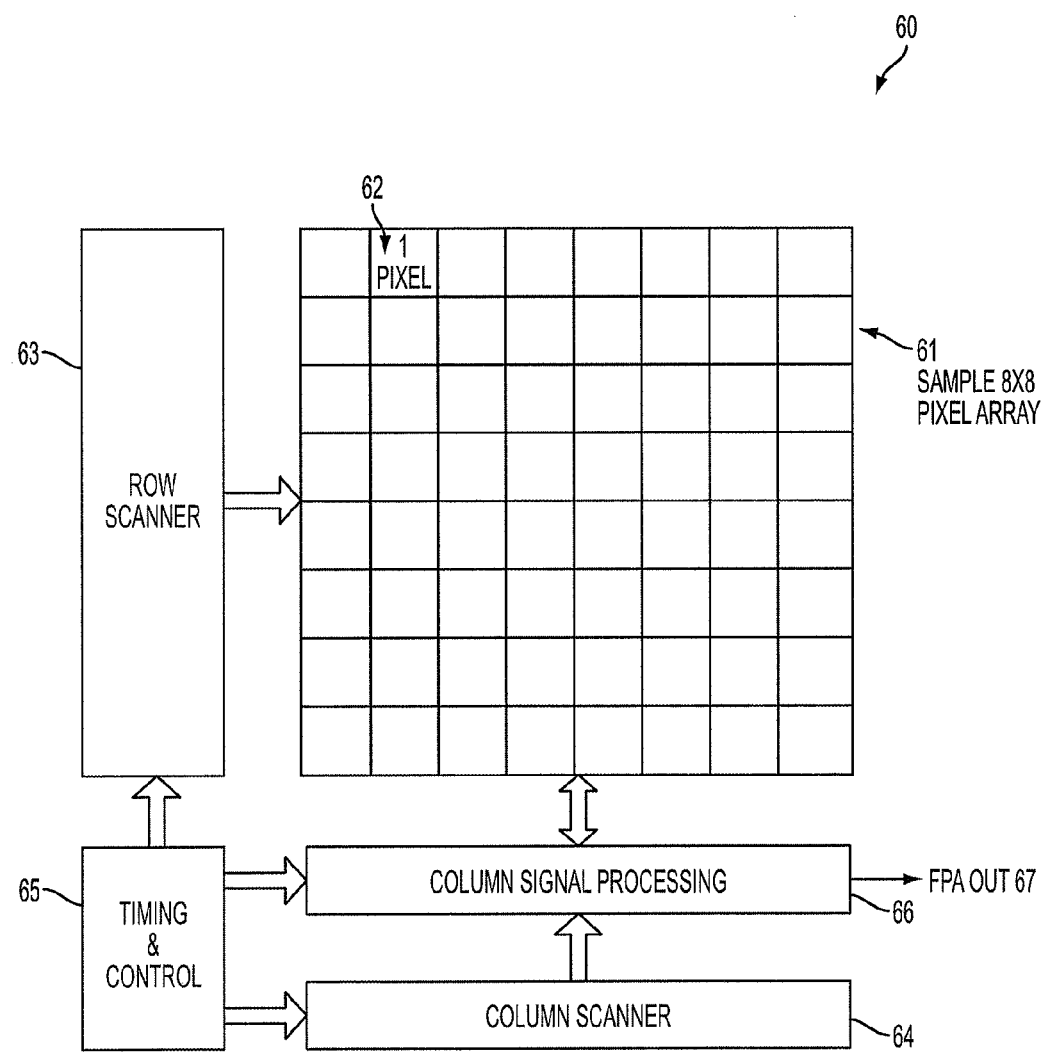
FIG. 6 is a signal processor architecture for processing the output signals from each pixel unit cell in the THz FPA imaging sensor, in accordance with an embodiment of the present invention.

FIG. 6 illustrates a signal processor, generally designated as 60, as an example of an architecture configured for processing the output signals from each pixel unit cell in the THz FPA sensor system. In the example, an 8×8 unit cell array 61 is shown. Each unit cell is designated as 62. As known in the art, signal processor 60 is configured to sequentially read-out the entire array of pixels in a system having pixels in an FPA. Thus, processor 60 provides as an output the columns in every sequential row of the FPA, the output generally shown as FPA output 67.

Thus, signal processor 60 may be used to read-out, in sequence, each pixel output 48 (FIG. 4) or each pixel output 58 (FIG. 5) disposed in the THz FPA sensor system, thereby providing a non-coherent FPA output, or a coherent FPA output, respectively.

Completing the description of signal processor 60, a row scanner 63 and a column scanner 64 are provided to sequentially scan each signal outputted from each summing circuit in each pixel unit cell 62. Timing and control logic circuit 65 controls row scanner 63 and column scanner 64. The sequential output signals provided from the unit pixels in the THz FPA sensor system are processed by a column signal processor 66. The column signal processor outputs the processed signals as the FPA image read-out. It will be understood that the aforementioned description pertains to the FPA image read-out obtained by processing the signals from each summation circuit (47 in FIG. 4, or 57 in FIG. 5) in the THz FPA sensor system.

It will be appreciated that the present invention is based on a monolithic CMOS or BiCmos THz pixel unit cell with a physical scale defined by an optical resolution spot size of a THz image (typically 300 um×300 um in size). The diffraction limited resolution spot size for an imaging system is defined by the wavelength and the lens' numerical aperture (NA) or f# (f-number). The minimum spot size, in general, scales as the wavelength.

Since the pixel unit cell contains a multitude of independent antennae with each coupled to a separate CMOS amplifier (FET) within the THz unit cell, and since the signals from each FET amplifier are summed, either incoherently or coherently, the present invention significantly improves the THz signal strength within each resolution element (THz pixel unit cell) of the array.

Alternatively, the process described above for the summation of each antenna in the array may also be used by averaging the output from each context pixel disposed in a respective unit cell. Then, the signal processor shown in FIG. 6 may be utilized to sequentially scan each averaged output from a respective unit pixel 62 in the array 61 of the THz FPA sensor system.

Referring now to FIGS. 7A-7D, there are shown planar views of different antennae array orientations in a unit pixel cell, in accordance with aspects of the present invention. Each of the antennae array orientations may be used to capture THz waves using various polarizations. As an example, FIG. 7A shows a THz FPA sensor system having an 8×8 pixel array, generally designated as 70. A magnified planar view of a portion of the THz FPA sensor system is shown in FIG. 7B, as a 2×2 pixel array, designated as 71. Each pixel unit cell in the 2×2 array is designated as 72.

As an example, antennae array 73 includes two rows of THz antennae. The antennae array 73 includes antennae that are oriented in the same vertical direction. This allows the capture of THz signals having a vertical polarization of THz waves per unit pixel. Since all four unit pixels in the 2×2 array 71 have antennae that are vertically oriented, all four unit pixels would each sum (either coherently or incoherently) all the vertically polarized THz signals detected by a respective antennae array 73.

FIG. 7C provides another example of a magnified planar view of a 2×2 pixel array, designated as 74, which shows each pixel unit cell (75A, 75B, 75C, 75D) having antennae arrays oriented in different directions. Pixel unit cells 75A and 75B include antennae arrays that are orthogonal to each other; and pixel unit cells 75C and 75D include antennae arrays that are also orthogonal to each other. This configuration of pixel array 74 allows for each pixel unit cell to capture THz signals that are polarized, for example, at a relative angle of 0 degrees, 90 degrees, 180 degrees and 270 degrees.

Referring next to FIG. 7D, there is shown a magnified planar view of yet another example of a pixel unit cell 76. This pixel unit cell includes an array of four spiral antennae 77. The orientation of antennae 77 allows pixel unit cell 76 to capture circularly polarized signals, as well as vertical and horizontal polarizations of THz waves. It will be understood, however, that any combination of antennae orientations is contemplated by the present invention.

Figure 8:
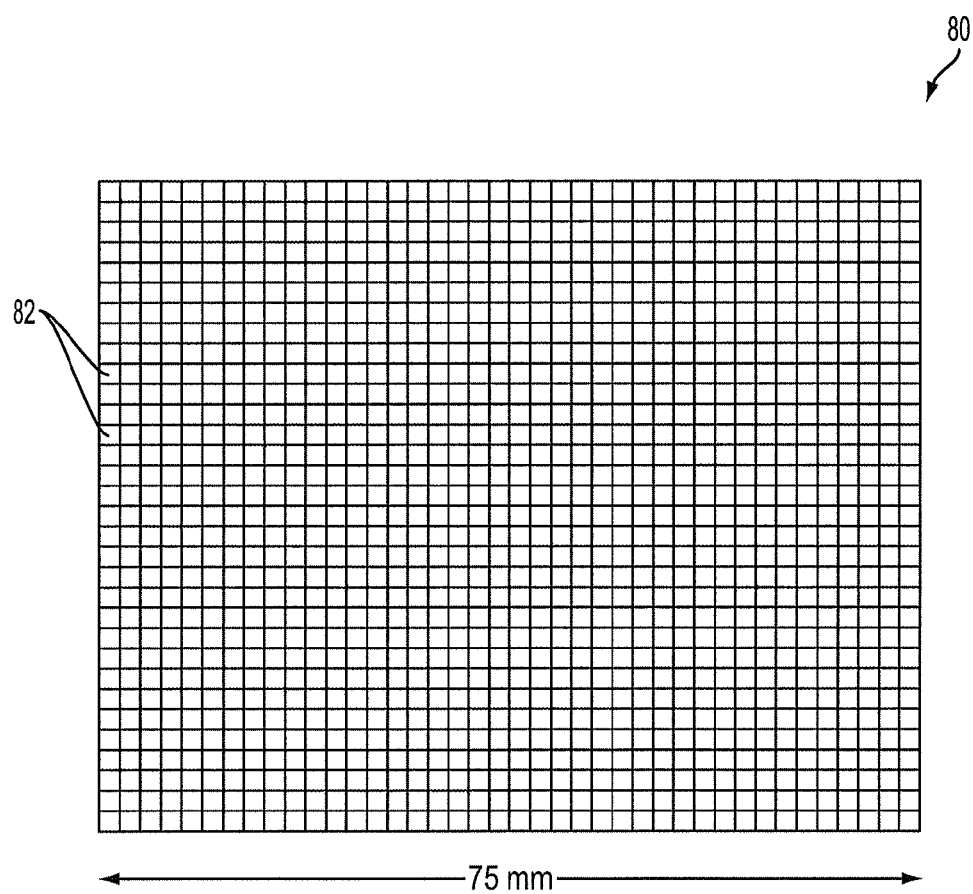
FIG. 8 is a planar view of a THz FPA sensor system, in which each pixel cell includes a Fabry-Pérot tuning cell on the top of a monolithic structure and an antennae array disposed below each tuning cell, in accordance with an embodiment of the present invention.

FIG. 8 is a planar view of a THz FPA sensor system, generally designated as 80. The THz FPA sensor system 80 has width and length dimensions of about 75 mm×75 mm and includes a 256×256 array of pixel unit cells, in which each pixel unit cell is designated as 82. Each pixel unit cell 82 is fabricated in accordance with aspects of the present invention. For example, each pixel unit cell 82 may include the antennae array shown in FIGS. 3A, 3B and 7. Moreover, the THz FPA sensor system 80 may include the image processor described with respect to FIGS. 4, 5 and 6. In addition, each pixel unit cell 82 may include a unit tuning cell, or a MEMS tunable etalon, as shown in FIGS. 1, 2A and 2B. Each MEMS tunable etalon filters the optical light arriving from above the structure and transmits the respective filtered light to a respective antennae array formed below the MEMS tunable etalon. Accordingly, each MEMS tunable etalon is arranged in a matrix format above the antennae array. In one embodiment, for example, one MEMS tunable etalon (26 or 28) may correspond to one pixel unit cell 82. In this example, the MEMS tunable etalons are arranged in an array of 256×256 tuning cells.

Figure 9:
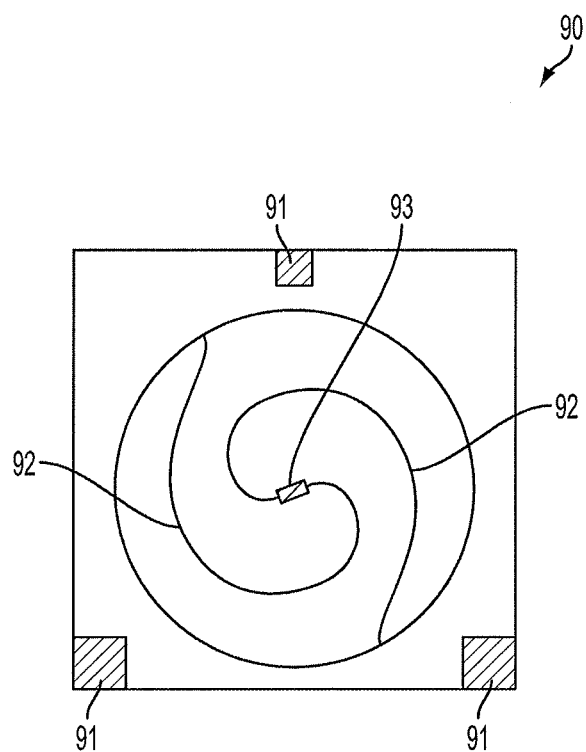
FIG. 9 is an overhead view of a single THz detector assembly which is positioned below a single tuning cell, in accordance with an embodiment of the present invention.

Yet another example of the present invention is shown in FIG. 9, as an overhead view of a single THz detector assembly 90. The single tuning cell, such as MEMS tunable etalon 28 or 26 (FIGS. 2A and 2B), includes a set of two spiral arm antennae 92 having each end terminating in a detector cell 93. A tuning piston/support structure is also shown using a 3-point mount. The structure shown in FIG. 9 may be scaled to have resonance centers to cover 600 GHz to 2600 GHz.

Figure 10A:
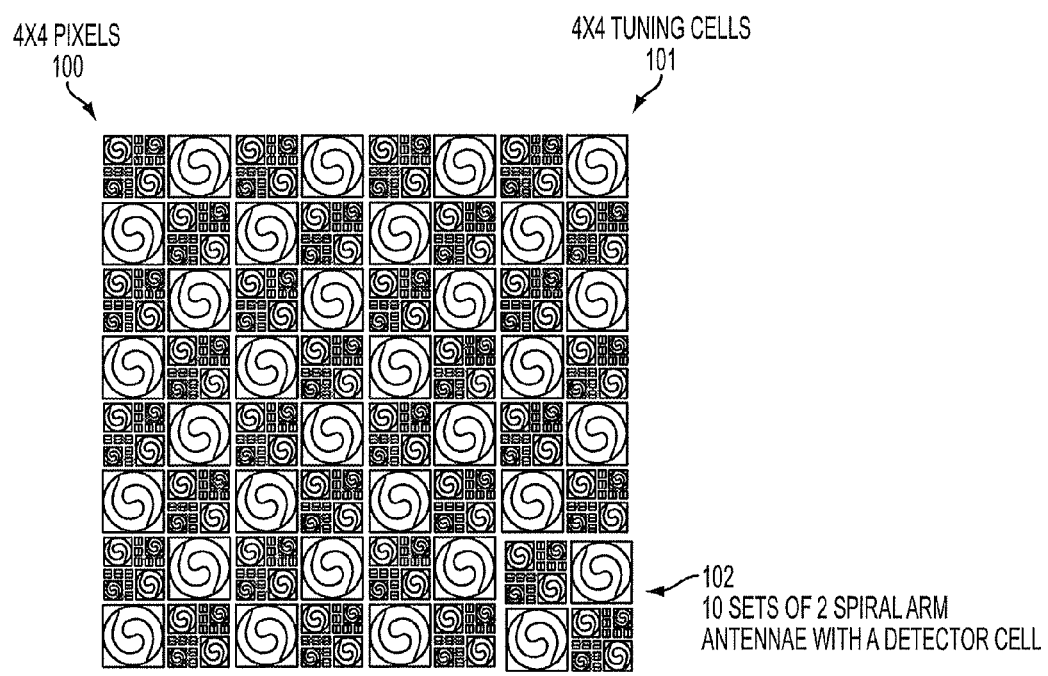
FIG. 10A is an overhead view of a 4×4 THz detector pixels in the imaging sensor, corresponding to 4×4 tuning cells and 4×4 THz detector assemblies, in which each THz detector assembly includes 10 sets of 2 spiral arm antennae with a detector cell, in accordance with an embodiment of the present invention.

Still another embodiment of the present invention is shown in FIG. 10A. As shown, a THz EPA imaging array 100 includes 4×4 unit pixels (4×4 shown for ease of explanation). Each unit pixel in the THz FPA array 100 includes a single tuning cell, or unit tuning cell. Thus, a 4×4 array of 16 tuning cells are formed in the THz FPA imaging array, the 16 tuning cells designated as 101. It will be understood that each unit tuning cell may be configured as shown in FIG. 1 (etalon 11), FIG. 2A (etalon 28), and FIG. 2B (etalon 26).

Still referring to FIG. 10A, underneath each unit tuning cell, there is formed an antennae matrix 102. Each antennae matrix 102 includes 10 sets of 2 spiral arm antennae with a detector cell (FIG. 9, for example). It will be understood that the 10 sets are sized differently to have 5 different resonances, respectively, centered at 5 bands covering 400 GHz to 2400 GHz.

Figure 10B:
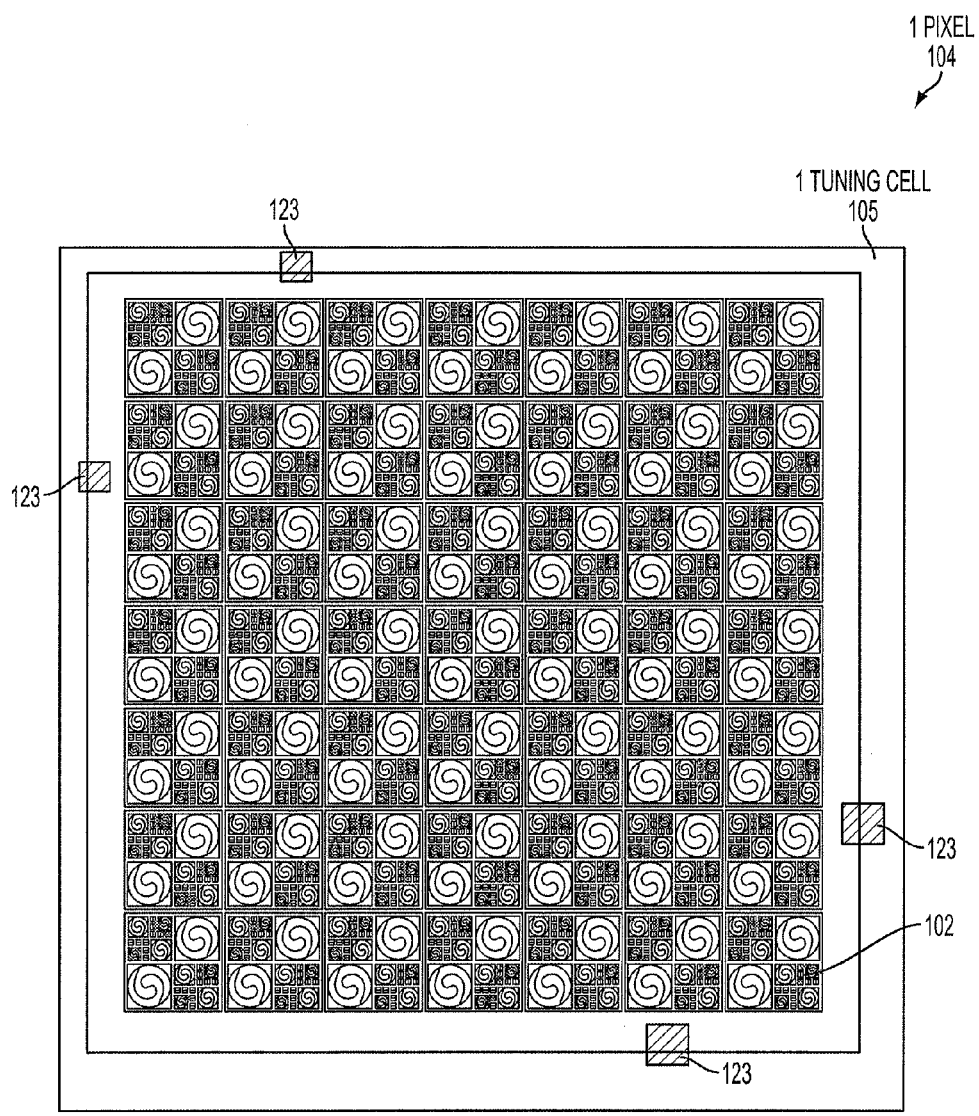
FIG. 10B is an overhead view of a single cell imaging sensor, corresponding to a single tuning cell and 7×7 THz detector assemblies, in which each THz detector assembly includes 10 sets of 2 spiral arm antennae with a detector cell, in accordance with an embodiment of the present invention.

Yet another embodiment of the present invention is shown in FIG. 10B. As shown, a THz FPA imaging array includes one unit pixel 104. Each unit pixel in the THz FPA array includes a single tuning cell 105, or unit tuning cell 105. Underneath each unit tuning cell 105 there is formed an array of 7×7 sets of THz detector assemblies, in which each detector assembly is designated as 102. The actuators or supports for providing the gap to form the etalon of the single tuning cell 105 is shown as a four-point support system 123.

Figure 10C:
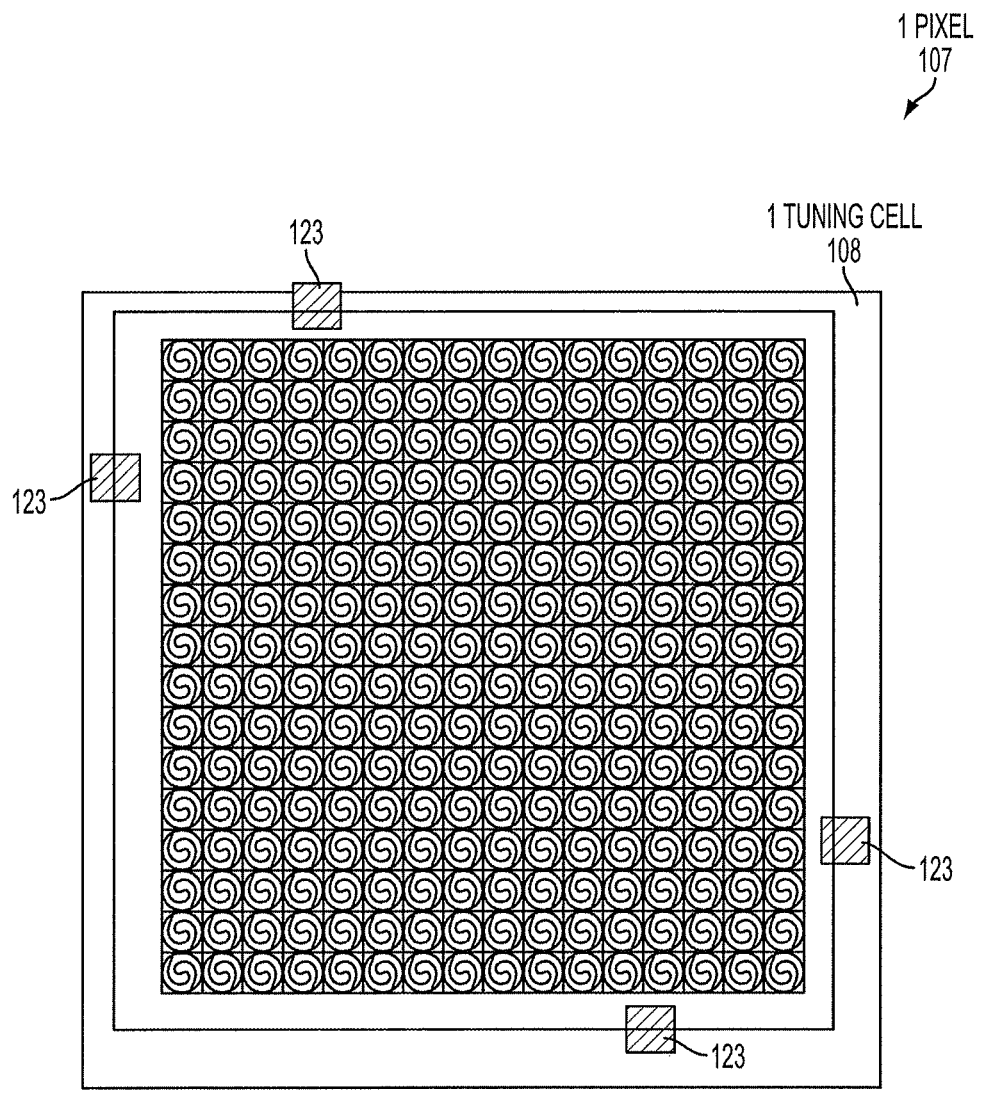
FIG. 10C is an overhead view of a 16×16 cell imaging sensor, in which each THz detector assembly has an identical antennae matrix, in accordance with an embodiment of the present invention.

Still another embodiment of the present invention is shown in FIG. 10C. As shown, a multi-element THz FPA imaging array has an identical antennae matrix in accordance with an embodiment of the present invention. As shown, one unit pixel 107 includes a single tuning cell 108. The one unit pixel 107 includes a 16×16 array of identical antennae. A four point support system 123 is also shown.

Figure 11:
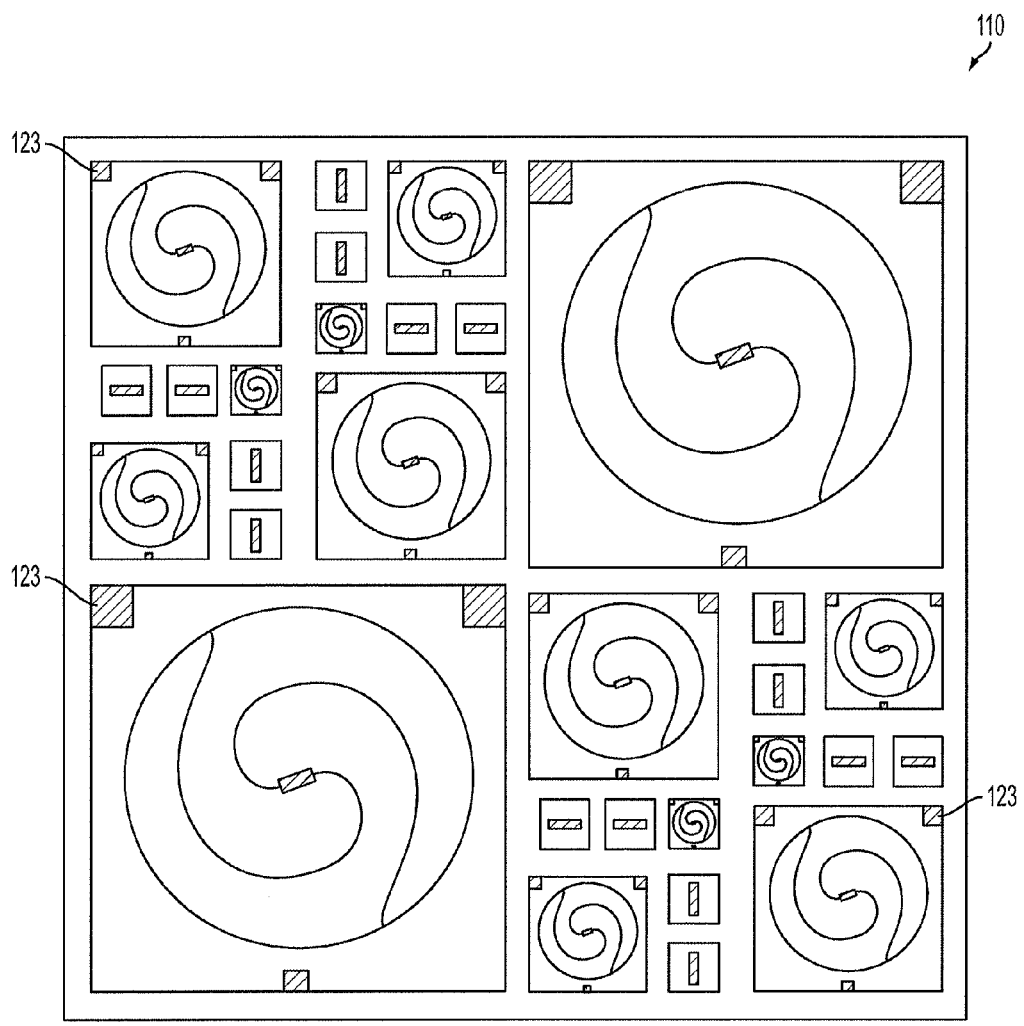
FIG. 11 is another example of one THz detector assembly (also referred to as an antennae matrix) per one unit tuning cell, or per one tunable etalon, in accordance with an embodiment of the present invention. The antennae matrix unit cell is depicted with four independent antennae types, each type designed to provide approximately 0.5 THz of spectral bandwidth in a spectrally contiguous manner that collectively yields a broad spectral bandpass range of approximately 0.6 THz to 2.6 THz across the unit tuning cell.

FIG. 11 shows another configuration of an antennae matrix per one unit tuning cell, or per one tunable etalon. The antennae matrix is designated as 110 and includes 14 sets of 2 spiral arm antennae with a detector cell (FIG. 9, for example). Four different sized spiral arms are shown in the figure.

Figure 12:
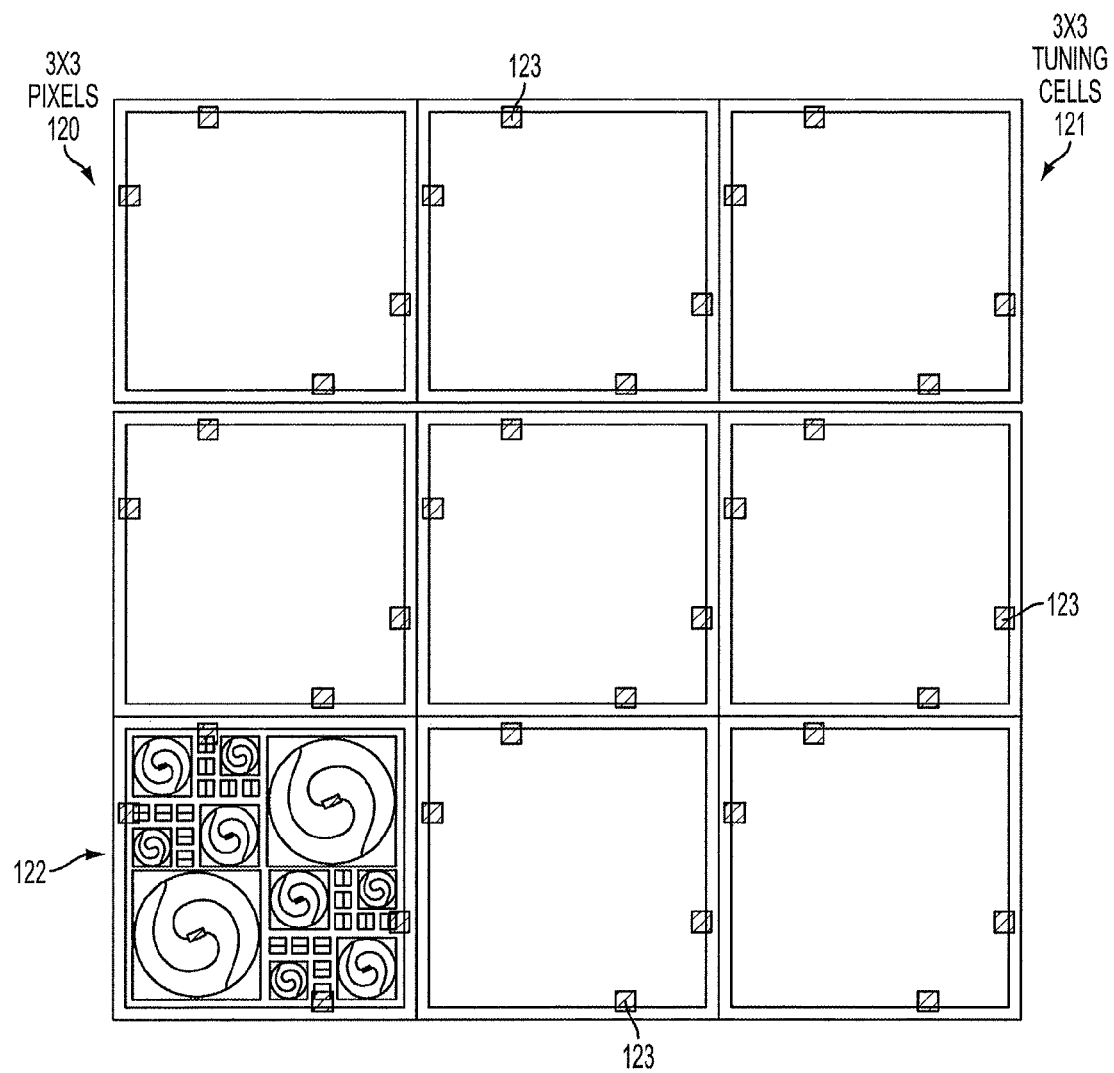
FIG. 12 is an overhead view of a 3×3 imaging sensor, corresponding to 3×3 tuning cells and 3×3 THz detector assemblies, in which each THz detector assembly includes 10 sets of 2 spiral arm antennae with a detector cell, in accordance with an embodiment of the present invention.

FIG. 12 depicts a THz FPA imager having 3×3 pixels, designated as 120. Each of the 3×3 pixels includes a Fabry-Pérot unit cell, thereby providing 3×3 tuning cells, designated as 121. Below each tuning cell, there is an antennae matrix, designated as 122. The configuration shown in FIG. 12 is similar to the configuration shown in FIG. 10, except that FIG. 12 shows an actuator/support using a 4-point mount, in which each mount is designated as 123.

Figure 13:
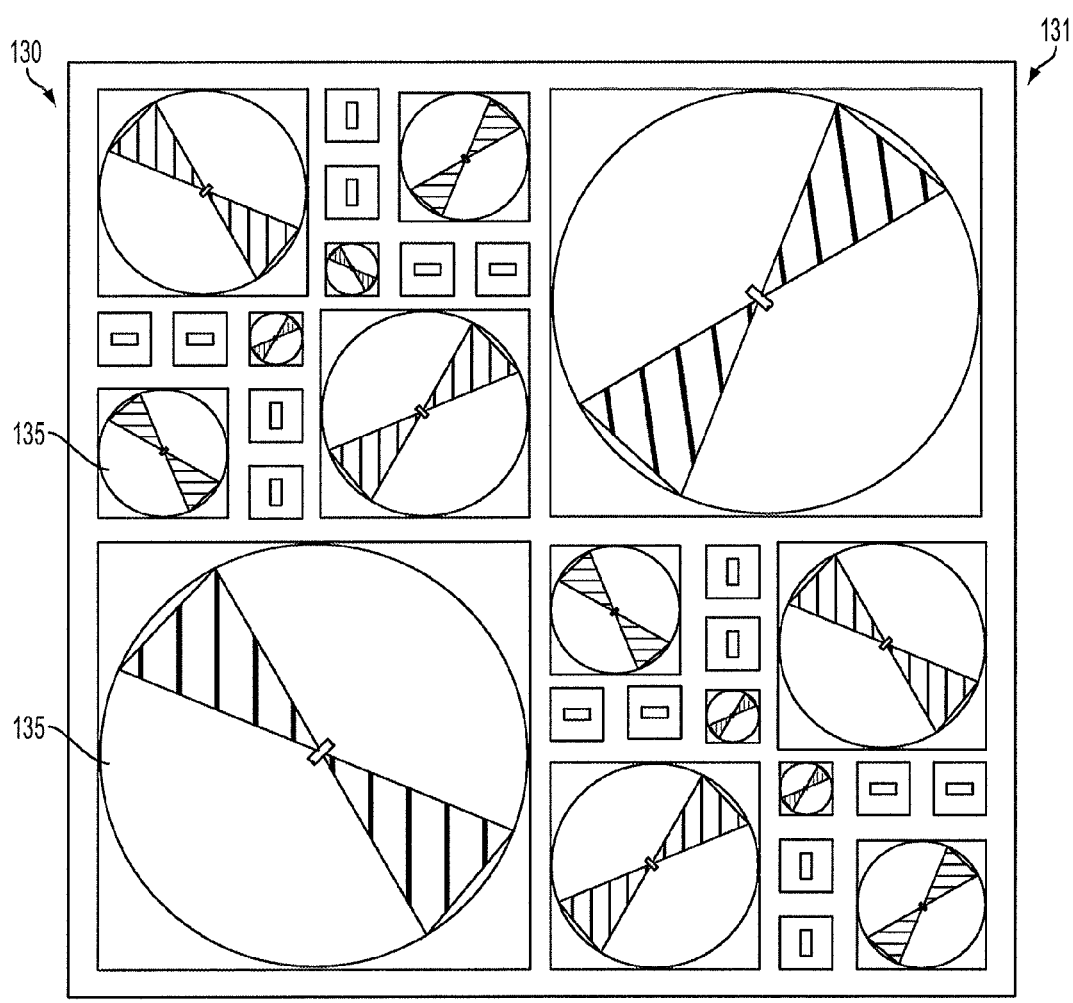
FIG. 13 is an overhead view of a multi-antennae imaging unit cell that contains four distinct antennae structures, where each antenna is coupled to one or more electronic detection elements. The antennae structures cover a plurality of discrete THz frequency bands that together may continuously cover a broad spectral range from approximately 0.6 THz to 2.6 THz, in accordance with an embodiment of the present invention.

FIG. 13 depicts a THz antenna structure (130) comprising a single pixel antenna matrix similar to 110 in FIG. 11, beneath an incorporated external etalon tuning structure (131). Each antennae matrix includes multiple bow-tie configured antennae of different sizes and orientations, designated as 135. It is well understood by those skilled in the art, that in accordance with the present invention, the antennae matrix may include a variety of antenna configurations and polarizations.

Figure 14A:
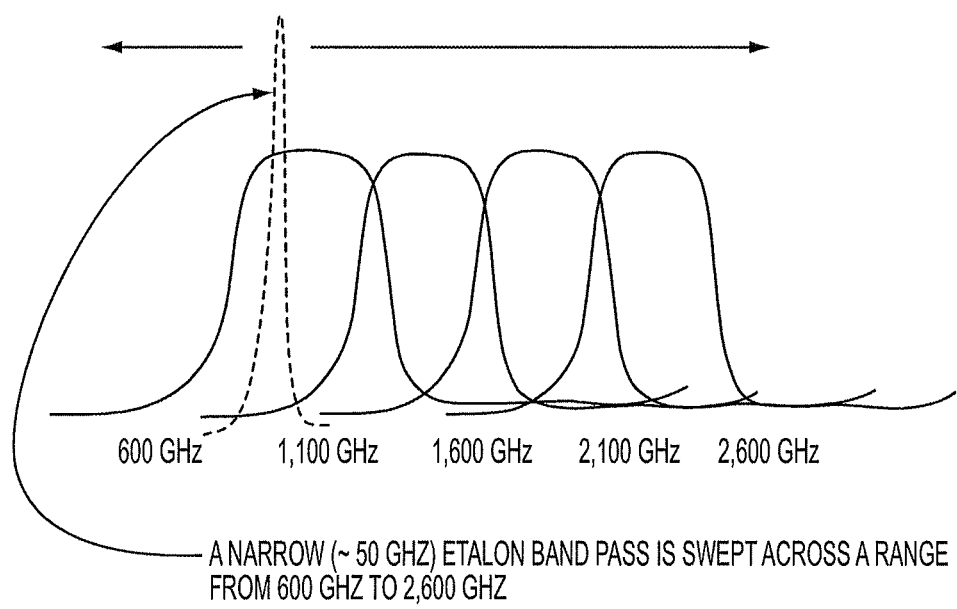
FIG. 14A depicts cascading of a narrow band tunable Etalon filter, approximately 50 GHz wide, which may be swept across a broad spectral window that covers a spectral region of approximately 600 GHz-2,600 GHz. This window is comprised of four contiguous 500 GHz band pass regions provided by four independent antennae configurations disposed below a THz unit tuning cell area. The narrow band etalon tuning, thus, produces a system with a spectral selectivity that is controllable. In the embodiment shown, there are approximately 40 discrete etalon tuning positions to cover the complete band pass from 600 GHz to 2600 GHz.

FIG. 14A depicts cascading of a narrow band tunable etalon filter, approximately 50 GHz wide, which may be swept across a broad spectral window covering a spectral region of approximately 600 GHz-2,600 GHz. The window is comprised of four contiguous 500 GHz band pass regions provided by four independent antennae configurations disposed below a THz unit tuning cell region. The narrow band etalon tuning produces a system with a spectral selectivity that is controllable by varying the etalon gap width. In this example, there are about 40 discrete etalon tuning positions which cover the complete band pass from 600 GHz to 2600 GHz. The tuning of the mirror spacing may be accomplished by using discrete positions, or continuously controllable positions.

Figure 14B:
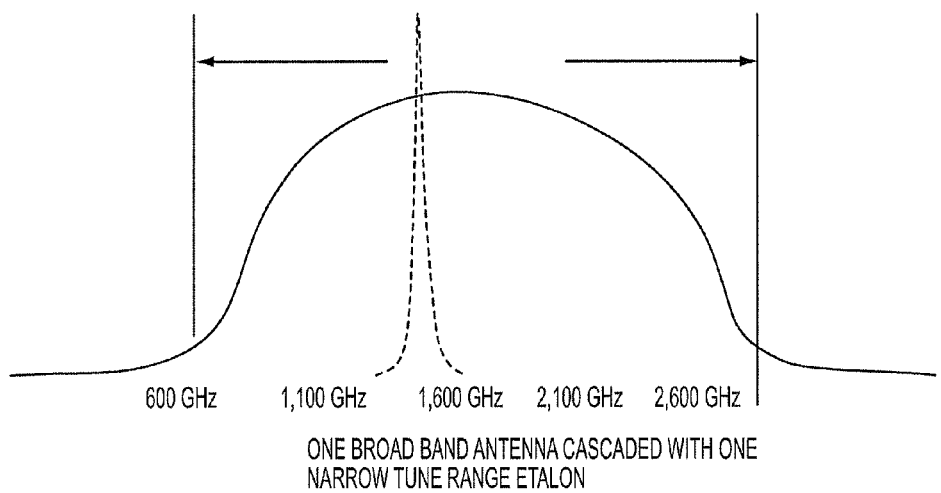
FIG. 14B depicts cascading of a narrow band tunable etalon filter, approximately 50 GHz wide, which may be swept across a broad spectral window covering a spectral region of approximately 600 GHz-2,600 GHz that is provided by a single broad band antennae configuration that is disposed below a THz unit tuning cell area. The narrow band etalon tuning, thus, produces a system with a spectral selectivity that is controllable. In the embodiment shown, there are about 40 discrete etalon tuning positions to cover the complete band pass from 600 GHz to 2600 GHz.

FIG. 14B depicts cascading of a narrow band tunable etalon filter, approximately 50 GHz wide, which may be swept across a broad spectral window covering a spectral region of approximately 600 GHz-2,600 GH. The window is provided by a single broad band antennae configuration disposed below a THz unit etalon tuning cell area. The narrow band etalon tuning produces a system with a spectral selectivity that is controllable by varying the gap width. In this example, there are about 40 discrete etalon tuning positions which cover the complete band pass from 600 GHz to 2600 GHz. The tuning of the mirror spacing may be accomplished by using discrete positions, or continuously controllable positions.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. A focal plane array (FPA) comprising:
an array of multiple tuning cells disposed on a monolithic substrate, in which each tuning cell includes:
a micro electrical mechanical system (MEMS) tunable etalon disposed in the monolithic substrate, and
an array of THz detector assemblies, each THz detector assembly comprising antennas of at least two independent antenna types and a detector disposed in the monolithic substrate, wherein:
each type of independent antenna receives a different spectral bandwidth;
the array of THz detector assemblies are disposed below the MEMS tunable etalon;

each detector provides detection of a signal from a respective antenna type; and the monolithic substrate includes, in layered sequence, (a) the MEMS tunable etalon, (b) the array of THz detector assemblies, including the antennas of the at least two independent antenna types and the detector in each THz detector assembly, and (c) an interconnection layer including amplifiers.

2. The FPA of claim 1, wherein:
the array of multiple tuning cells includes an M×N array, where M represents an integer number of rows and N represents an integer number of columns in the array.

3. The FPA of claim 1, wherein:
each tuning cell has length and width dimensions of approximately 250 microns to approximately 400 microns.

4. The FPA of claim 1, wherein:
each MEMS tunable etalon includes a Fabry-Pérot interferometer comprised of upper and lower mirrors, spaced by a gap between the mirrors, the gap forming an etalon of the interferometer.

5. The FPA of claim 4, wherein:
the upper and lower mirrors are spaced by either a three-point mount or a four-point mount, and
the mount is configured to provide the gap between the mirrors.

6. The FPA of claim 4, wherein:
the gap is configured to provide a tuning range, in which the tuning range has a resonance centered about a predetermined band, and
the predetermined band covers a portion of a range spanning 600 GHz to 2600 GHz.

7. The FPA of claim 4, wherein:
the gap is configured to include a spacing between the upper and lower mirrors, and
the gap is configured to provide an optical spacing for the interferometer which is selected to vary over approximately 250 microns or more.

8. The FPA of claim 1, wherein:
each THz detector assembly includes two types of spiral arm antennas,
each of the two types of spiral arm antennas is coupled to the detector of each THz detector assembly, and
the detector is located below the MEMS tunable etalon and at a center region of each THz detector assembly.

9. The FPA of claim 1, wherein:
each THz detector assembly includes at least four sets of different types of spiral arm antennas, wherein each set comprises two antennas of the same spiral arm type and each set is independent and different from the other sets of spiral arm antennas,
each set of two spiral arm antennas is coupled to a respective detector of each THz detector assembly, and
the respective detector is located below the MEMS tunable etalon and at an equal distance from a center region of each THz detector assembly.

10. The FPA of claim 1, wherein:
each THz detector assembly includes multiple sets of two spiral arm antennas,
each set of two spiral arm antennas is configured to resonate at a predetermined resonance frequency, and
a resonance frequency of one set is different from a resonance frequency of another set, and
each set of two spiral arm antennas is located below the MEMS tunable etalon and at a different distance from a center region of each THz detector assembly.

11. The FPA of claim 1, wherein:
each THz detector assembly includes an array of THz antennas having the at least two independent antenna types,
each THz antenna in the array of THz antennas is shaped in a bow-tie configuration and coupled to an amplifier by way of a respective pixel, and
a summing circuit is included for summing signals received by each array of THz antennas.

12. The FPA of claim 1, further comprising:
the array of multiple tuning cells forms a first M×N matrix of tuning cells, where M represents an integer number of rows and N represents an integer number of columns in the array,
each MEMS tunable etalon corresponds to each tuning cell in the array, and
each THz detector assembly is disposed below each MEMS tunable etalon, forming a second Y×Z matrix of THz antennas, wherein Y represents an integer number of rows greater than N and Z represents an integer number of columns greater than M.

13. A THz spectrometer, comprising:
a first array of tunable etalons, in which the tunable etalons are arranged in a matrix of M×N rows and columns, respectively, wherein the first array is configured to receive THz radiation and output filtered THz radiation;
a second array of THz detector assemblies arranged in a matrix of Y×Z rows and columns, respectively, wherein:
the first array disposed above the second array, and
each THz detector assembly in the second array of THz detector assemblies includes multiple sets of two independent antennas,
each set of the multiple sets of two independent antennas is configured to resonate at a different predetermined resonance frequency than the predetermined resonance frequency of another set of two independent antennas, and
each set of two independent antennas is located at a different distance from a center region of each THz detector assembly.

14. The THz spectrometer of claim 13, wherein:
Y is an integer greater than N, and
Z is an integer greater than M.

15. The THz spectrometer of claim 13, wherein:
each of the two independent antennas is configured to form at least one spiral arm antenna that terminates in a detector, and
each of the tunable etalons is configured to form a Fabry-Pérot etalon.

16. The THz spectrometer of claim 13, wherein:
each of the two independent antennas is configured to form a bow-tie antenna that is coupled to an amplifier, and
each of the tunable etalons is configured to form a Fabry-Pérot etalon.

17. The THz spectrometer of claim 13, wherein:
each of the multiple sets of two independent antennas comprising two spiral arm antennas, and
at least one set of the plurality of sets of two spiral arm antennas is different in size from another set of the plurality of sets; and
each of the tunable etalons is disposed above each respective THz detector assembly.

18. The THz spectrometer of claim 13 further comprising:
a substrate disposed below the second array; and
a summing circuit disposed in the substrate for summing the output signals received from antennas in the second array, and providing an enhanced signal of the filtered radiation.

19. The THz spectrometer of claim 13, further comprising:
an image processor for scanning the rows and the columns of the second array and providing an output image representing the scanned rows and columns.

20. The THz spectrometer of claim 13, wherein:
the second array is formed monolithically above the substrate during a fabrication process, and
the first array is formed separately and then aligned to the second array.

21. The THz spectrometer of claim 20, wherein:
the first array includes piezo-electric stacks for separating first and second mirrors forming the tunable etalons.

22. The THz spectrometer of claim 13, wherein:
the second array is formed monolithically above the substrate during a fabrication process, and
the first array is formed monolithically above the substrate during the same fabrication process.

23. The THz spectrometer of claim 13, wherein:
the second array is formed monolithically above the substrate during a fabrication process,
a lower mirror of the first array is formed monolithically above the second array during the same fabrication process, and
an upper mirror of the first array is formed separately and then aligned to the lower mirror.

* * * * *